US009786153B2

(12) United States Patent
London

(10) Patent No.: US 9,786,153 B2
(45) Date of Patent: Oct. 10, 2017

(54) MULTI-MODAL TRACKING LOCATOR ALARM SYSTEM

(71) Applicant: Justin London, Chicago, IL (US)

(72) Inventor: Justin London, Chicago, IL (US)

( * ) Notice: Subject to any disclaimer, the term of this patent is extended or adjusted under 35 U.S.C. 154(b) by 0 days.

(21) Appl. No.: 14/950,556

(22) Filed: Nov. 24, 2015

(65) Prior Publication Data
US 2016/0240067 A1    Aug. 18, 2016

Related U.S. Application Data

(60) Provisional application No. 62/085,221, filed on Nov. 26, 2014.

(51) Int. Cl.
| | |
|---|---|
| *G08G 1/09* | (2006.01) |
| *G08B 21/24* | (2006.01) |
| *H04M 11/04* | (2006.01) |
| *G08B 3/10* | (2006.01) |
| *G08B 13/14* | (2006.01) |
| *G08B 6/00* | (2006.01) |
| *H04W 4/02* | (2009.01) |
| *G08B 21/02* | (2006.01) |

(52) U.S. Cl.
CPC ............. *G08B 21/24* (2013.01); *G08B 3/10* (2013.01); *G08B 6/00* (2013.01); *G08B 13/1427* (2013.01); *G08B 21/0261* (2013.01); *H04M 11/04* (2013.01); *H04W 4/021* (2013.01); *H04W 4/027* (2013.01); *G08B 21/023* (2013.01); *G08B 21/028* (2013.01); *G08B 21/0269* (2013.01); *G08B 21/0275* (2013.01); *G08B 21/0277* (2013.01); *G08B 21/0288* (2013.01)

(58) Field of Classification Search
CPC ........................................................ G08B 21/24
USPC .................................................... 340/539.32
See application file for complete search history.

(56) References Cited

U.S. PATENT DOCUMENTS

| | | | |
|---|---|---|---|
| 3,772,645 A | 11/1973 | Odenz et al. | |
| 3,828,310 A | 8/1974 | Miller | |
| 4,030,087 A | 6/1977 | Ritchie et al. | |
| 4,187,497 A | 2/1980 | Harless et al. | |

(Continued)

OTHER PUBLICATIONS

Search Report for Application No. PCT/US2015/062327 dated Mar. 24, 2016.

(Continued)

*Primary Examiner* — Santiago Garcia
(74) *Attorney, Agent, or Firm* — Dinsmore & Shohl LLP

(57) ABSTRACT

Tagged receivers, tracking locator alert systems, and methods of transmitting an alert are disclosed. A tagged receiver receives a command over the network interface hardware, executes the received command, send data indicative of the status of an asset to which the tagged receiver is attached over the network interface hardware, determines an alert event has occurred, and activates an alert in response to determining that the alert event has occurred. The command includes arming the tagged receiver, disarming the tagged receiver, emitting an alert from the tagged receiver, sending data indicative of location, or a combination thereof. The alert event includes the motion sensors sensing a movement of the asset, receiving a command to emit an alert over the network interface hardware, the asset leaving a predetermined geo-fenced area, or a combination thereof.

20 Claims, 33 Drawing Sheets

(56) References Cited

U.S. PATENT DOCUMENTS

| | | | |
|---|---|---|---|
| 4,663,611 A | 5/1987 | Humphrey |
| 4,901,054 A | 2/1990 | Waterman |
| 4,968,973 A | 11/1990 | Rowland |
| 4,980,667 A | 12/1990 | Ames |
| 5,023,596 A | 6/1991 | Sirman et al. |
| 5,059,948 A | 10/1991 | Desmeules |
| 5,117,217 A | 5/1992 | Nykerk |
| 5,194,845 A | 3/1993 | Sirmon et al. |
| 5,262,757 A | 11/1993 | Hansen |
| 5,270,681 A | 12/1993 | Jack |
| 5,408,212 A | 4/1995 | Meyers et al. |
| 5,499,014 A | 3/1996 | Greenwaldt |
| 5,534,847 A | 7/1996 | McGregor |
| 5,721,532 A | 2/1998 | Lehmann et al. |
| 5,737,247 A | 4/1998 | Baer et al. |
| 5,760,681 A | 6/1998 | Varis et al. |
| 5,764,135 A | 6/1998 | Warren |
| 5,781,102 A | 7/1998 | Huang |
| 5,815,069 A | 9/1998 | Horton |
| 5,836,002 A | 11/1998 | Morstein et al. |
| 5,889,463 A | 3/1999 | Judd et al. |
| 5,900,705 A | 5/1999 | Kimura |
| 5,917,405 A | 6/1999 | Joao |
| 5,986,548 A | 11/1999 | McGregor |
| 6,040,764 A | 3/2000 | Crisci |
| 6,043,733 A | 3/2000 | Lind |
| 6,060,982 A | 5/2000 | Holtrop |
| 6,172,607 B1 | 1/2001 | McDonald |
| 6,233,506 B1 | 5/2001 | Obradovich et al. |
| 6,236,307 B1 | 5/2001 | Kurano |
| 6,317,036 B1 | 11/2001 | Popat et al. |
| 6,433,683 B1 | 8/2002 | Robinson |
| 6,463,385 B1 | 10/2002 | Fry |
| 6,510,380 B1 | 1/2003 | Curatolo et al. |
| 6,693,585 B1 | 2/2004 | MacLeod |
| 6,700,533 B1 | 3/2004 | Werb et al. |
| 6,734,790 B1 | 5/2004 | Hodget |
| 6,759,947 B2 | 7/2004 | Aceves |
| 6,771,972 B2 | 8/2004 | McDonnell et al. |
| 6,806,814 B1 | 10/2004 | Iverson et al. |
| 6,831,557 B1 | 12/2004 | Hess |
| 6,864,789 B2 | 3/2005 | Wolfe |
| 6,919,803 B2 | 7/2005 | Breed |
| 7,034,665 B2 | 4/2006 | Kojika et al. |
| 7,049,914 B2 | 5/2006 | Lamb et al. |
| 7,104,091 B2 | 9/2006 | Kuhblank |
| 7,171,187 B2 | 1/2007 | Haave et al. |
| 7,212,103 B2 | 5/2007 | Oyagi et al. |
| 7,218,227 B2 | 5/2007 | Davis et al. |
| 7,221,263 B2 | 5/2007 | Moore et al. |
| 8,854,207 B2 | 10/2014 | Williams |
| 8,866,607 B2 | 10/2014 | Velusamy |
| 2002/0113704 A1 | 8/2002 | Hess |
| 2004/0004542 A1 | 1/2004 | Faulkner et al. |
| 2004/0039522 A1 | 2/2004 | Jwo |
| 2004/0041708 A1 | 3/2004 | Greenwaldt |
| 2004/0119583 A1 | 6/2004 | Linden et al. |
| 2004/0155781 A1 | 8/2004 | DeOme |
| 2004/0160319 A1 | 8/2004 | Joao |
| 2004/0162875 A1 | 8/2004 | Brown |
| 2005/0085257 A1 | 4/2005 | Laird et al. |
| 2005/0128074 A1 | 6/2005 | Culpepper et al. |
| 2005/0179541 A1 | 8/2005 | Wolfe |
| 2006/0164217 A1 | 7/2006 | Bourgine De Meder |
| 2006/0187026 A1 | 8/2006 | Kochis |
| 2006/0214779 A1 | 9/2006 | Harumoto et al. |
| 2006/0220842 A1 | 10/2006 | Breed |
| 2006/0226975 A1* | 10/2006 | Keebler, Jr. ............ G08B 21/24 340/539.29 |
| 2007/0040678 A1 | 2/2007 | Kojo |
| 2007/0182548 A1 | 8/2007 | Raad |
| 2008/0174425 A1* | 7/2008 | Torning ............. G08B 13/1427 340/540 |
| 2010/0289646 A1* | 11/2010 | Raniere ................. G08B 13/14 340/572.1 |
| 2012/0223822 A1* | 9/2012 | Ferringo ................. G01S 1/725 340/384.7 |
| 2012/0242481 A1* | 9/2012 | Gernandt ........... G06K 19/0705 340/539.13 |
| 2013/0162429 A1* | 6/2013 | Pfuhl ..................... A45C 13/18 340/539.13 |
| 2014/0073262 A1* | 3/2014 | Gutierrez ............ H04M 1/7253 455/67.11 |
| 2014/0173439 A1* | 6/2014 | Gutierrez ............... G08B 21/24 715/727 |
| 2014/0230057 A1* | 8/2014 | Berger .................... G06F 21/88 726/23 |
| 2014/0240088 A1* | 8/2014 | Robinette .......... G08B 13/1427 340/5.61 |
| 2015/0126234 A1* | 5/2015 | Rodriguez ............. G08B 13/22 455/457 |
| 2015/0156567 A1* | 6/2015 | Oliver ..................... H04Q 9/00 340/870.07 |
| 2015/0186773 A1* | 7/2015 | Weill ..................... G06Q 10/00 706/13 |
| 2015/0242665 A1* | 8/2015 | Antonescu ......... G06K 19/0724 340/8.1 |
| 2015/0356858 A1* | 12/2015 | Daoura .................. G06Q 10/00 340/539.32 |
| 2015/0359127 A1* | 12/2015 | Daoura ..................... H02J 7/35 320/101 |

OTHER PUBLICATIONS

Spider Wrap. www.spiderwrap.com/video1.htm. Published Nov. 20, 2015.
Halo Metrics. www.halometrics.com/ Published Nov. 20, 2015.
Skymall Holdings LLC. www.skymall.com/gps-homing-device/78558.html. Published Nov. 20, 2015.
Tracking System Direct www.tracking-system.com/for-consumers/gps-tracking-theft-recovery.html. Published Nov. 20, 2015.
Tile Inc. www.thetileapp.com. Published Nov. 20, 2015.
Wireless Sensor Tags. www.wirelesstag.net/. Published Nov. 20, 2015.
Alpha High Theft Solutions. www.alphaworld.com/en/our-solutions/cableloks/. Published Nov. 20, 2015.
Alpha High Theft Solutions. www.alphaworld.com/en/our-solutions/spider-wraps/. Published Nov. 20, 2015.
Spybike. gpstrackthis.com. Published Nov. 20, 2015.

* cited by examiner

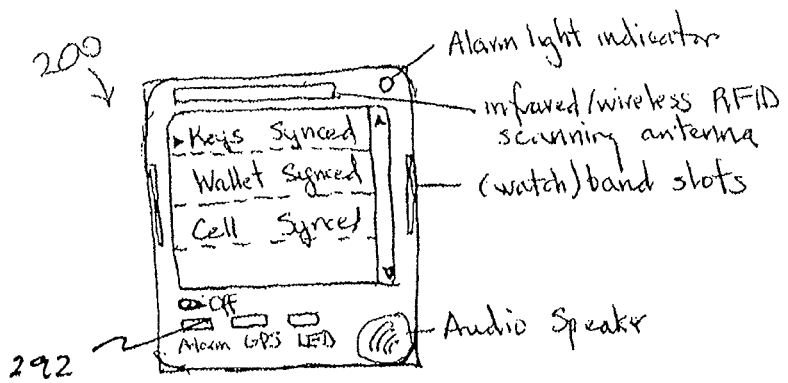
Fig 1 Front of Locator/Transmitter
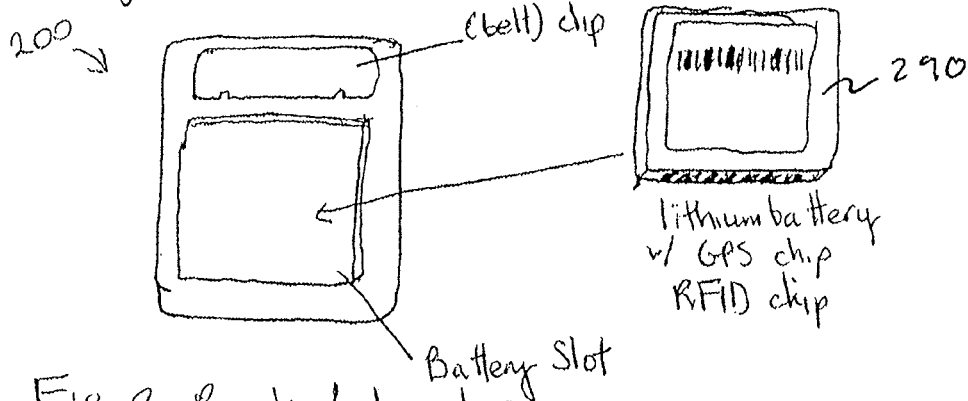
Fig 2 Back of Locator
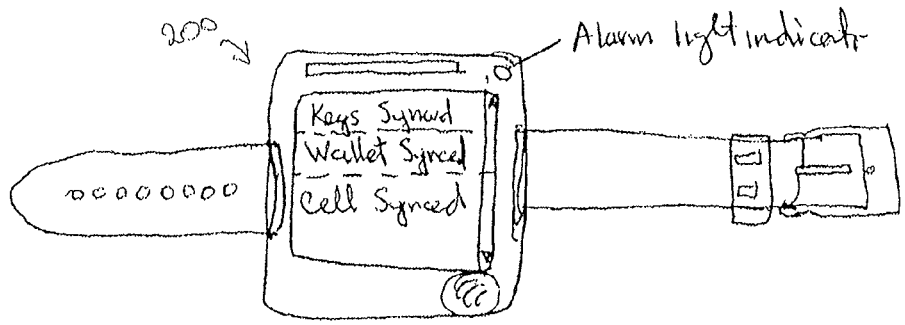
Fig 3 Locator w/ Watch Bands

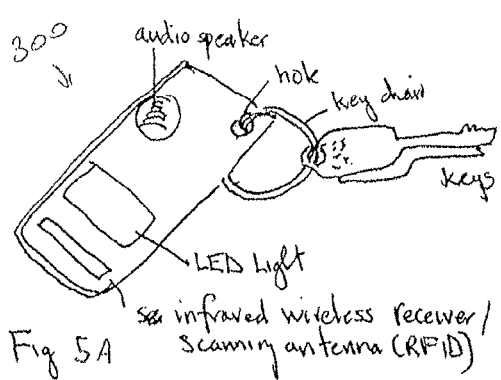
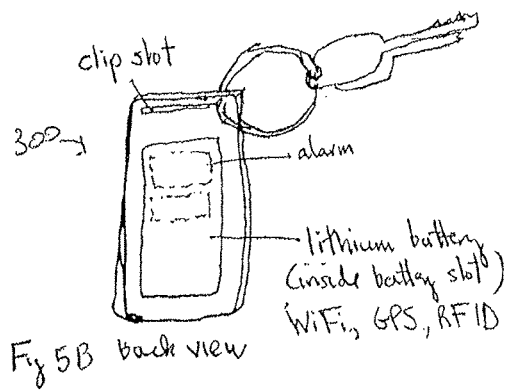
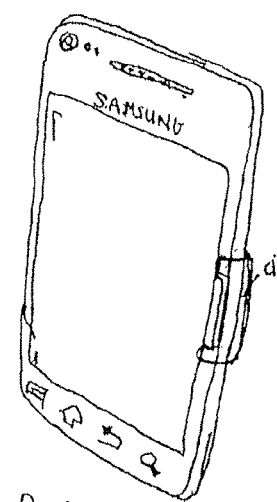
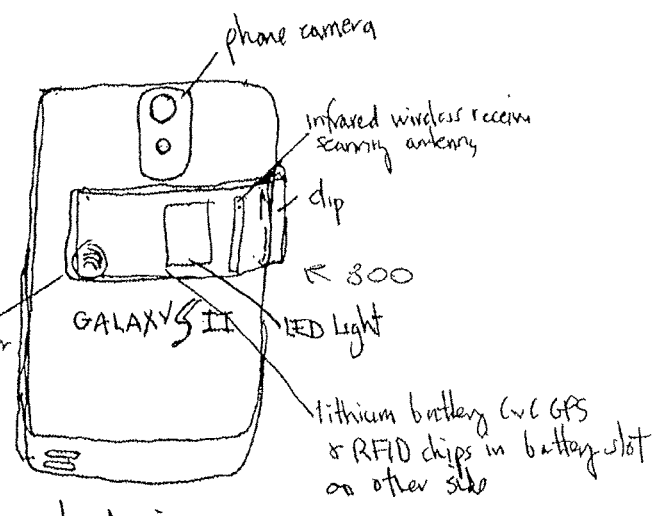

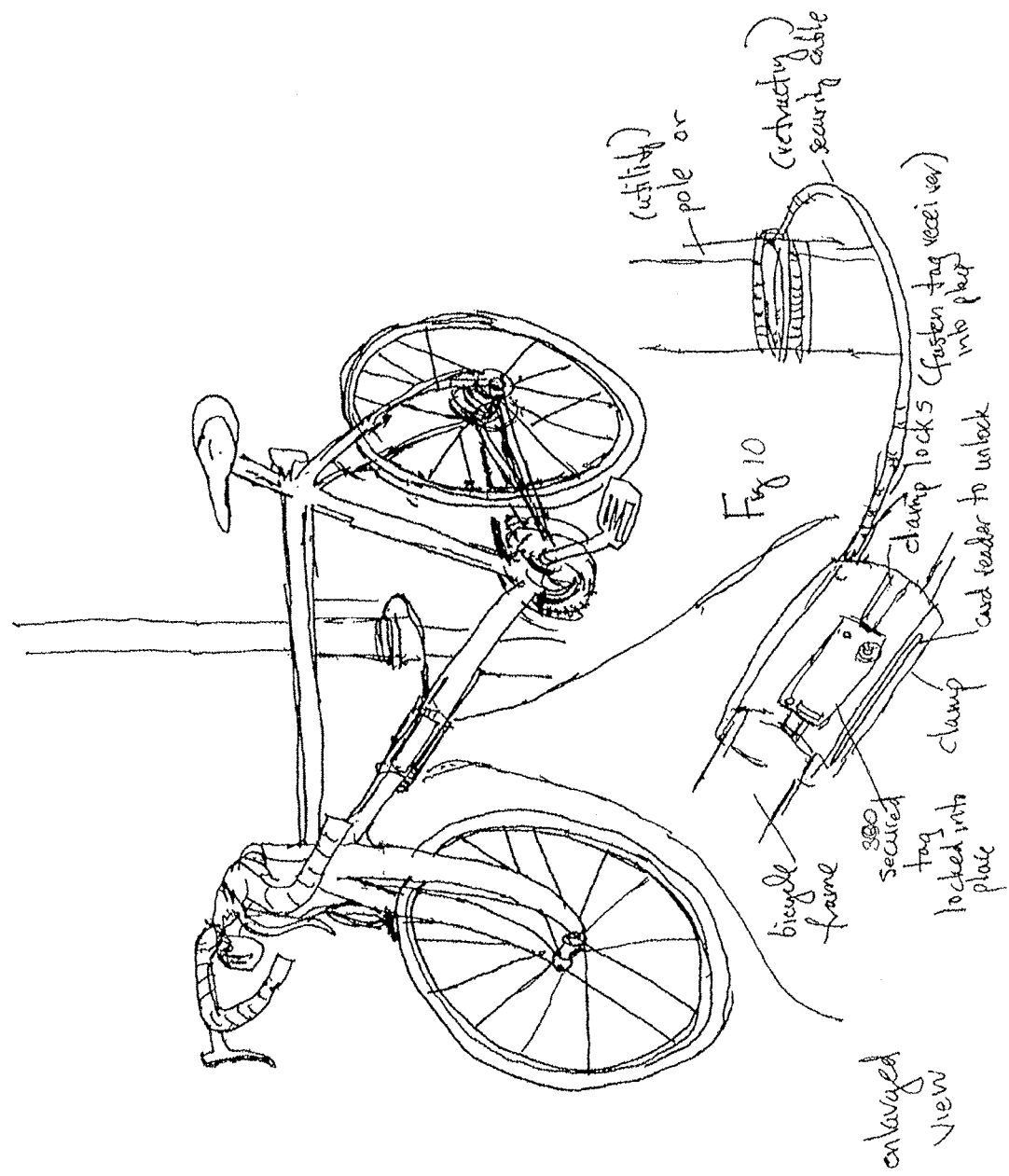

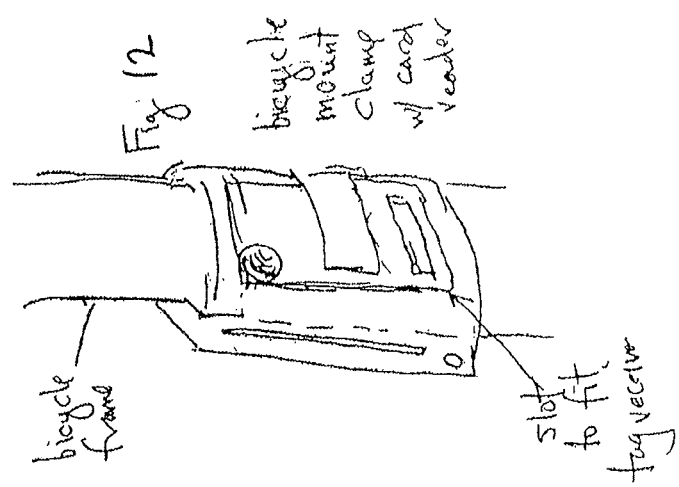

Eyeglasses w/ smaller smaller tag receiver put
inside purse pocket

MULTI-MODAL TRACKING LOCATOR ALARM SYSTEM

CLAIM OF PRIORITY

This application claims the benefit of U.S. Provisional Application No. 62/085,221, entitled "Multi-Modal Tracking Locator Alarm System," filed Nov. 26, 2014, the entirety of which is hereby incorporated by reference.

TECHNICAL FIELD

Embodiments described herein generally relate to systems and methods for indicating the location of an asset and, more specifically, to systems and methods for indicating the location of an asset utilizing transmitters and tagged receivers.

BACKGROUND

A common problem consumers face is misplacing and forgetting important items like keys, wallets, cell phones, iPods, and glasses. The amount of money that is spent by consumers who have to replace lost or misplaced items is enormous. Currently, there are devices that provide tracking capabilities, but they are substantially limited by their geo-fence (e.g. a predefined virtual boundary, perimeter, radius, or zone around a location point) so that if an item is misplaced beyond the geo-fence, the item cannot be located rendering such device useless. Some devices have longer range tracking capabilities, but either are limited to the number of items or type of items that they track such as LoJack which is used only to track cars and has to be installed. Other tracking devices either do not alert the user if the item is moved or stolen. Some tracking devices only sound an alarm if the item is tampered with. These alarms are often ignored because such alarms are easy to set off accidentally (e.g. going off when no attempted tampering has occurred). No devices actually alert the public that an item is stolen.

Accordingly, a need exists for multi-modal tracking locator alarm systems that can secure, track, locate, and alert a user as to the location of various assets with flexible geo-fencing that can be dynamically changed and to notify the public if an item is stolen.

SUMMARY

In one embodiment, a tagged receiver includes one or more processors, one or more memory modules communicatively coupled to the one or more processors, an alarm light indicator communicatively coupled to the one or more processors, a speaker communicatively coupled to the one or more processors, network interface hardware communicatively coupled to the one or more processors, one or more motion sensors communicatively coupled to the one or more processors, and a power supply. The power supply provides power to the tagged receiver. The power supply includes one or more embedded chips. The one or more embedded chips include one or more WiFi Chips, one or more GPS chips, one or more Bluetooth Chips, one or more RFID Chips, or a combination thereof. The tagged receiver further includes a satellite antenna for sending and receiving GPS location data, and machine readable instructions stored in the one or more memory modules. When executed by the one or more processors, the machine readable instructions cause the tagged receiver to receive a command over the network interface hardware, execute the received command, send data indicative of the status of an asset to which the tagged receiver is attached over the network interface hardware, determine an alert event has occurred, and activate an alert in response to determining that the alert event has occurred. The command includes arming the tagged receiver, disarming the tagged receiver, emitting an alert from the tagged receiver, sending data indicative of location, or a combination thereof. The alert event includes the motion sensors sensing a movement of the asset, receiving a command to emit an alert over the network interface hardware, the asset leaving a predetermined geo-fenced area, or a combination thereof.

In another embodiment, a tracking locator alert system includes a control device and one or more tagged receivers configured to communicate wirelessly with the control device. The control device includes a first one or more processors, a first one or more memory modules communicatively coupled to the one or more processors, a first display communicatively coupled to the first one or more processors, a first power supply, a digital compass including a magnetic sensor, a first microphone communicatively coupled to the first one or more processors, first tactile input hardware communicatively coupled to the first one or more processors, first network interface hardware communicatively coupled to the first one or more processors, a first satellite antenna for sending and receiving GPS location data, and first machine readable instructions stored in the first one or more memory modules. The first power supply provides power to the control device. The digital compass is communicatively coupled to the one or more processors. When executed by the first one or more processors, the first machine readable instructions cause the control device to receive, through the first network interface hardware, a data signal indicative of the location and the status of an asset, display the location and the status of the asset on the first display, and send at least one command via the first network interface hardware indicative of at least one of arming the tracking locator alert system, disarming the tracking locator alert system, and activating an alert of the tracking locator alert system. Each of the one or more tagged receiver includes a second one or more processors, a second one or more memory modules communicatively coupled to the second one or more processors, a magnet that emits a magnetic field that can be detected by magnetic sensors, mounting hardware configured to affix the tagged receiver to a tracked asset, a second alarm light indicator communicatively coupled to the second one or more processors, a second speaker communicatively coupled to the second one or more processors, second network interface hardware communicatively coupled to the second one or more processors, one or more motion sensors communicatively coupled to the second one or more processors, a second power supply, a second satellite antenna for sending and receiving GPS location data, and second machine readable instructions stored in the second one or more memory modules. The second power supply provides power to the tagged receiver. The second power supply includes one or more embedded chips. The one or more embedded chips include one or more WiFi chips, one or more GPS chips, one or more Bluetooth chips, one or more RFID chips, or a combination thereof. When executed by the second one or more processors, the second machine readable instructions cause the tagged receiver to receive a command over the second network interface hardware, execute the received command, send data indicative of the status of an asset to which the tagged receiver is attached over the second network interface hardware to the control device, determine an alert event has occurred, and activate an alert in response to determining that the alarm event has occurred. The command includes arming the tagged receiver, disarming the tagged receiver, emitting an alert from the tagged receiver, sending data indicative of location, or a combination thereof. The alert event includes the motion sensors sensing a movement of the asset, receiving a command to emit an alert over the second network interface hardware, the asset leaving a predetermined geo-fenced area, or a combination thereof.

In yet another embodiment, a method of receiving an alert from a tracking locator alert system includes syncing a tagged receiver configured to attach to and track an asset to a control device such that the tagged receiver and the control device wirelessly communicate with each other, setting user preferences, monitoring the asset for an alert event, determining that an alert event has occurred, activating an alert in response to determining that the alarm event has occurred, and transmitting an alert message comprising GPS coordinates of the tagged receiver to the control device, an internet server, or a combination thereof. The user preferences include geo-fencing parameters, sensitivity of motion sensors, personalized alert output, personalized alert events, or a combination thereof. The alert includes an audio alarm, an alarm light, an alert message comprising GPS coordinates of the tagged receiver, or a combination thereof.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 1 illustrates a front view of a control device, according to one or more embodiments shown and described herein;

FIG. 2 illustrates a back view of the control device of FIG. 1, according to one or more embodiments shown and described herein;

FIG. 3 illustrates a control device with an integrated wrist band, according to one or more embodiments shown and described herein;

FIG. 5A illustrates a tag receiver, according to one or more embodiments shown and described herein;

FIG. 5B illustrates a rear view of the tag receiver of FIG. 5A, according to one or more embodiments shown and described herein;

FIG. 6 illustrates a front view of a cellular phone with a tag receiver attached thereto, according to one or more embodiments shown and described herein;

FIG. 7 illustrates a rear view of the cellular phone with the tag receiver attached thereto of FIG. 6, according to one or more embodiments shown and described herein;

FIG. 10 illustrates a perspective view of a bicycle with a tag receiver attached thereto, according to one or more embodiments shown and described herein;

FIG. 12 illustrates a tag receiver clamp with an integrated card reader, according to one or more embodiments shown and described herein;

DETAILED DESCRIPTION

Figure 4:
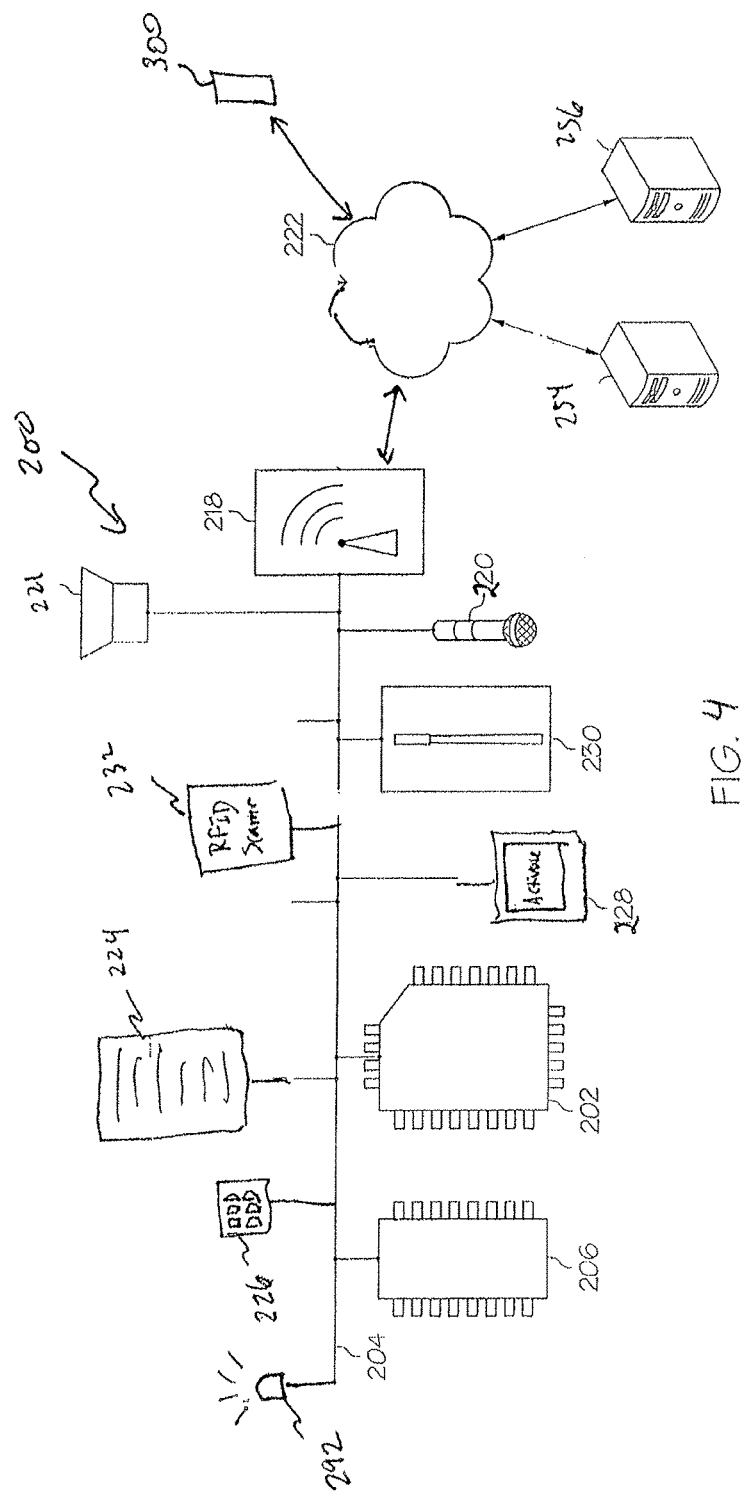
FIG. 4 schematically depicts a control device, according to one or more embodiments shown and described herein.

The embodiments disclosed herein include multi-modal tracking locator alarm systems for securing, tracking, locating, and alerting a user to the whereabouts of an asset. Referring generally to the figures, embodiments of the multi-modal tracking locator alarm systems provided herein track the location of an asset and generally include one or more control devices and one or more tagged receivers. Some embodiments described herein include anti-theft configurations to emit a (voice-activated) alert to deter theft and/or alert the appropriate authorities to the theft/attempted theft. Further embodiments continue tracking a stolen asset to assist in the recovery of the asset and have global tracking capabilities. The various multi-modal tracking locator alarm systems are described in more detail herein with specific reference to the corresponding drawings.

Some embodiments described herein may be used with virtually any type of item and can be tracked from a single device. Some embodiments herein may function as both a deterrent and a recovery device. Some embodiments described herein may facilitate the tracking of stolen items. In addition to alerting a user that a tagged item may have been moved beyond a certain range, some embodiments described herein may assist a user in recovering missing or misplaced items. For instance, in a loud place such as a restaurant or nightclub, it may be hard to hear the alarm with people talking and music playing. In a large home where items might be placed in different locations, having an alarm sound if the item goes beyond a certain range is not useful since the user is likely already within close range of the items inside the house such that the alarm will not sound. Thus, embodiments describe herein may allow users the ability to specify and change the tracking range or geo-fence as well as to activate the alarm (or a prerecorded WAV sound file embedded inside the device) to detect where the sound is emanating from so the item can be located. In some embodiments, the WAV file, such as the sound of a train horn, will be distinct to the embodiment and not mistaken as a common car alarm, bicycle bell, or other electronic chirp or ringtone that consumers have become use to. Some embodiments described herein may provide a single device that can track all of these items simultaneously when each item is tagged separately. The embodiments described herein may be multi-modal, allowing a user to track a stolen or misplaced device in a variety of manners. The embodiments described herein may be useful for tracking a variety of items, ranging from vehicles, bicycles, electronics, cargo as well as to any number of household items that may be misplaced such as wallets and cell phones.

As described herein an alarm event includes a number of events that may cause an alert to be admitted from one of the control device, the tagged receiver, or a combination thereof. Alarm events include but are not limited to activation of the alarm by the user from the control device, activation by the user from the tagged receiver, or activation by the tagged receiver when it senses a motion beyond set parameters. Additional alarm events are described in greater detail below.

Referring now to the drawings, FIGS. 1-4 illustrate control devices, according to one or more embodiments disclosed herein. Control devices are configured to receive from and send to a tagged receiver (as shown in FIGS. 5A-15) signals indicative of tracking, locating, or alerting a status of the asset to which the tagged receiver is attached. For example, a user may use the control device to locate an asset with a tagged receiver attached thereto on a map. In other embodiments, the control device may remotely activate an alert of the tagged receiver. Control devices may be kept in a variety of locations but may be small enough to carry with a user. In some embodiments, a control device could be disposed on a watch band (FIG. 3) or have a clip attachment removably coupled to a backside of the control device (FIG. 2). Furthermore, control devices as disclosed herein may send and receive signals from multiple tagged receivers at the same time. Referring now to FIG. 4, an embodiment of a control device 200, including a number of components is schematically depicted. It should be understood that the control device 200 may be embedded within a mobile computing device (e.g., cellular phone, laptop computer, etc.) and/or the functions of the control device 200 may be made available to the user through a mobile applications over an Internet connection.

Still referring to FIG. 4, the control device 200 includes one or more processors 202, a power supply (e.g., a battery 290 shown in FIG. 2), a communication path 204, one or more memory modules 206, a display 224, an alarm light indicator 292 (e.g., as shown in FIG. 1), a microphone 220, a speaker 221, tactile input hardware 226, an activation switch 228, network interface hardware 218, a satellite antenna 230, and an RFID scanner 232. In some embodiments, the control device 200 is Bluetooth enabled and/or comprises an RFID Scanner. The various components of the control device 200 and the interaction thereof will be described in detail below.

As noted above, the control device 200 includes the power supply. The power supply may be a battery (e.g., the battery 290 shown in FIG. 2). In some embodiments, the battery is a lithium battery that supplies power to the different components of the control device 200. In some embodiments, the power supply includes embedded chips. The embedded chips may include a Radio Frequency Identification (RFID) chip, a Global Position System (GPS) chip, a Bluetooth® chip, WiFi chip, or a combination thereof, supporting wireless and GSM network data communications such as general packet radio system (GPRS). GPRS supports SMS messaging and broadcasting, push to talk over cellular (PoC), and instant message and presence. For example, as shown in FIG. 2, the battery 290 includes a GPS chip and an RFID chip.

Still referring to FIG. 4, the control device 200 includes the communication path 204. The communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 204 communicatively couples the various components of the control device 200. As used herein, the term "communicatively coupled" means that coupled components are capable of exchanging data signals with one another such as, for example, electrical signals via conductive medium, electromagnetic signals via air, optical signals via optical waveguides, and the like.

As noted above, the control device 200 includes the one or more processors 202. Each of the one or more processors 202 may be any device capable of executing machine readable instructions. Accordingly, each of the one or more processors 202 may be a controller, an integrated circuit, a microchip, a computer, or any other computing device. The one or more processors 202 are communicatively coupled to the other components of the control device 200 by the communication path 204. Accordingly, the communication path 204 may communicatively couple any number of processors with one another, and allow the modules coupled to the communication path 204 to operate in a distributed computing environment. Specifically, each of the modules may operate as a node that may send and/or receive data.

As noted above, the control device 200 includes the one or more memory modules 206. Each of the one or more memory modules 206 of the control device 200 is coupled to the communication path 204 and communicatively coupled to the one or more processors 202. The one or more memory modules 206 may comprise RAM, ROM, flash memories, hard drives, or any device capable of storing machine readable instructions such that the machine readable instructions can be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include program embedded software that enables a user to select or enter the type of item that has been tagged (i.e., has a tagged receiver attached thereto) and sync it to the control device 200. The "syncing" ensures that the tag receivers and control device 200 can communicate with one another through one of RFID data transmission, GPS data transmission, or a combination thereof such that the control device 200 actuate different alarm features on the tagged receiver and vice versa.

In some embodiments, the one or more memory modules 206 includes one or more RFID decoder algorithms, such as an automatic RFID code recognition engine that processes RFID input signals received from the RFID scanner and/or extracts information from such signals, as will be described in further detail below. Furthermore, the one or more memory modules 206 include machine readable instructions that, when executed by the one or more processors 202, cause the control device 200 to perform the actions described below.

In some embodiments, the one or more memory modules 206 may include one or more speech recognition algorithms, such as an automatic speech recognition engine that processes speech input signals received from the microphone 220 and/or extracts speech information from such signals. Furthermore, the one or more memory modules 206 include machine readable instructions that, when executed by the one or more processors 202, cause the speech recognition to perform the actions such as but not limited to locating an indicated tagged receiver, providing directions to the indicated tag receiver, actuating an alarm light indicator on the tagged receiver, or actuating the speaker 221 on the tagged receiver to emit an audio alarm or WAV sound file. For example, a user may ask, "Where are my keys?" and the control device 200 may respond through speech output through the speaker 221 and can state the location of the keys in addition to displaying their location (e.g. on a map like Google Earth/Maps or by displaying GPS coordinates, or the like). In addition, the speech recognition algorithm may be programmed or customized to only recognize and work with the user's voice, e.g. accept spoken security passcodes or activation of the alarm by the user, so that only known users can access the device and change settings and therefore provide further theft deterrence.

Still referring to FIG. 4, as noted above, the control device 200 comprises the display 224 for providing visual output such as, for example, information relating to a location and status of assets. The display 224 is coupled to the communication path 204 and communicatively coupled to the one or more processors 202. Accordingly, the communication path 204 communicatively couples the display 224 to other modules of the control device 200. The display 224 may include any medium capable of transmitting an optical output such as, for example, a cathode ray tube, light emitting diodes, a liquid crystal display 224, a plasma display 224, or the like. Moreover, the display 224 may be a touch screen that, in addition to providing optical information, detects the presence and location of a tactile input upon a surface of or adjacent to the display 224. Accordingly, the display 224 may receive mechanical input directly upon the optical output provided by the display 224. For example, the user can scroll through the listing of tagged receivers and the assets to which they are attached. In a further example, from the display 224, the alarm on the tagged receiver can be activated remotely, the GPS location (map and coordinates can be viewed), and the indicator light on the tag receivers can be activated so that if an item is misplaced or forgotten, the owner can activate the alarm (for hearing) via the RFID or Bluetooth, activate the LED lights (for seeing), and see the specific location on the display 224. For instance, the embodiment may use third-party tools like Google Earth/Maps that can be shown on the display 224 and zoomed in/out of to see the exact location of a tagged item.

As noted above, the control device 200 comprises the speaker 221 for transforming data signals from the control device 200 and/or the tagged receiver 300 into mechanical vibrations, in order to output audible prompts or audible information from the control device 200. The speaker 221 is coupled to the communication path 204 and communicatively coupled to the one or more processors 202. In some embodiments, the speaker is waterproof. However, it should be understood that in other embodiments the control device 200 may not include the speaker 221, such as in embodiments in which the control device 200 does not output audible prompts or audible information, but instead only visually provides output via the display 224.

As noted above, the control device 200 comprises the alarm light indicator 292 for transforming data signals from the control device 200 and/or the tagged receiver 300 into an illuminated signal in order to output visual alarm indications to the user. In some embodiments, the alarm light indicator 292 is an LED light (as shown in FIGS. 1 and 3). The alarm light indicator may allow a user to know when an alarm is set. For example, when a user indicates that the alarm is on, the alarm light indicator may blink. Similarly the alarm light indicator on the control device 200 may blink or remain lit when the control device 200 senses an alarm event that causes the alarm of a tagged receiver to go off.

Still referring to FIG. 4, as noted above, the control device 200 comprises tactile input hardware 226 coupled to the communication path 204 such that the communication path 204 communicatively couples the tactile input hardware 226 to other modules of the control device 200. The tactile input hardware 226 may be any device capable of transforming mechanical, optical, or electrical signals into a data signal capable of being transmitted with the communication path 204. Specifically, the tactile input hardware 226 may include any number of movable objects that each transform physical motion into a data signal that can be transmitted to over the communication path 204 such as, for example, a button, a switch, a knob, a microphone or the like.

The tactile input hardware 226 may include an alarm activation button, such that the tagged receiver emits an alarm to help locate the asset to which the tagged receiver is affixed. The tactile input hardware 226 may further include a GPS button such that a location of the tagged receiver is displayed on the display 224 (FIG. 1). The tactile input hardware 226 may further include a button to cause a light (e.g. a bright LED) on the tagged receiver to shine such that a location of the tagged receiver may be determined.

As noted above, the control device 200 comprises the microphone 220 for transforming acoustic vibrations received by the microphone 220 into a speech input signal. The microphone 220 is coupled to the communication path 204 and communicatively coupled to the one or more processors 202. As will be described in further detail below, the one or more processors 202 may process the speech input signals received from the microphone 220 and/or extract speech information from such signals to generate a response such as but not limited to displaying the indicated tagged receiver's location on the display 224, emitting an alarm from the tagged receiver, or emitting a light from the tagged receiver.

Still referring to FIG. 4, as noted above, the control device 200 comprises the activation switch 228 for activating or interacting with the control device 200. In some embodiments, the activation switch 228 is an electrical switch that generates an activation signal when flipped, such as when the activation switch 228 is flipped by a user when the user desires to utilize or interact with the control device 200. Some embodiments may include activation or deactivation by voice recognition.

As noted above, the control device 200 includes the network interface hardware 218 for communicatively coupling the control device 200 with the tagged receiver and a computer network 222. The network interface hardware 218 is coupled to the communication path 204 such that the communication path 204 communicatively couples the network interface hardware 218 to other modules of the control device 200. The network interface hardware 218 can be any device capable of transmitting and/or receiving data via a wireless or cellular network. Accordingly, the network interface hardware 218 can include a communication transceiver for sending and/or receiving data according to any wireless communication standard. For example, the network interface hardware 218 may include a chipset (e.g., antenna, processors, machine readable instructions, etc.) to communicate over wireless computer networks such as, for example, wireless fidelity (WiFi), WiMax, Bluetooth, IrDA, Wireless USB, Z-Wave, ZigBee, or the like. In some embodiments, the network interface hardware 218 includes a Bluetooth transceiver that enables the control device 200 to exchange information with the tagged receiver 300 via Bluetooth communication.

Still referring to FIG. 4, data from the tagged receiver 300 may be provided to the control device 200 via the network interface hardware 218. Specifically, the control device 200 may include an antenna for communicating over one or more of the wireless computer networks described above. Moreover, the control device 200 may include a mobile antenna for communicating with the network 222. Accordingly, the antenna may be configured to send and receive data according to a mobile telecommunication standard of any generation (e.g., 1G, 2G, 3G, 4G, 5G, etc.).

The network 222 generally includes one or more computing devices configured to receive and transmit data according to a network communication protocol. In some embodiments, the network 222 includes a wired systems such as public switched telephone network (PSTN) or a backhaul networks. In some embodiments, the network 222 includes one or more of a wide area network, a metropolitan area network, the Internet, a satellite network, or the like. Further example networks include but are not limited to GSM, GPRS, and WCDMA. Thus, the network 222 generally include one or more antennas, transceivers, and processors that execute machine readable instructions to exchange data over various wired and/or wireless networks.

In some embodiments, the network 222 can be utilized as a wireless access point by the control device 200 to access one or more servers (e.g., a first server 254 and/or a second server 256). The first server 254 and second server 256 generally include processors, memory, and chipset for delivering resources via the network 222. Resources can include providing, for example, processing, storage, software, and information from the first server 254 and/or the second server 256 to the control device 200 via the network 222. Additionally, it is noted that the first server 254 or the second server 256 can share resources with one another over the network 222 such as, for example, via the wired portion of the network, the wireless portion of the network, or combinations thereof.

Still referring to FIG. 4, the one or more servers accessible by the control device 200 via the network 222 may include third party servers that provide additional capability for performing the functionality described herein. For example, the first server 254 and/or the second server 256 may store the location coordinates (on a GPS map) from the tagged receiver in a database for retrieval by the control device 200. It should be understood that the control device 200 and/or the tagged receiver 300 may be communicatively coupled to any number of servers by way of the network 222.

As noted above, the control device 200 includes a satellite antenna 230 coupled to the communication path 204 such that the communication path 204 communicatively couples the satellite antenna 230 to other modules of the control device 200. The satellite antenna 230 is configured to receive signals from GPS satellites. Specifically, in one embodiment, the satellite antenna 230 includes one or more conductive elements that interact with electromagnetic signals transmitted by GPS satellites. The received signal is transformed into a data signal indicative of the location (e.g., latitude and longitude) the tagged receivers, by the one or more processors 202. Additionally, it is noted that the satellite antenna 230 may include at least one of the one or more processors 202 and the one or memory modules 206. The data may then be stored on one of one or more memory modules 206 of the control device 200 or the memory of a network server as described above.

As noted above, in embodiments wherein an RFID chip is utilized, the control device 200 also includes an RFID scanner 232. The RFID scanner 232 is configured to receive a signal from an RFID Chip or RFID tag of a tagged receiver. As such the tagged receiver and the control device 200 may be synced. When the tagged receiver and the control device 200 are synced, the newly synced tagged receiver may appear on the display 224 of the control device 200 as the asset to which the tagged receiver is attached. For example, if the user attaches a tagged receiver to their keys (using the key chain inserted into the hole on the tagged receiver as shown in FIG. 5A) and syncs it to the transmitter, "Keys" will appear in the list of monitored items as the control device 200 can "detect" that keys have been tagged by attached a tagged receiver thereto. In other embodiments, Bluetooth may be utilized in place of the RFID chip.

As noted above, the control device 200 interacts with the tagged receiver (e.g. by communicating information over the network 222) to receive information regarding the asset to which the tagged receiver is attached including but not limited to: general location, GPS coordinates, and whether or not the alarm of the tagged receiver has been activated. Similarly, the tagged receiver can send receive information from the control device 200 including but not limited to: instructions to activate the alarm system, instructions to emit an audio signal, and instructions to turn on an indicator light. This information may also be saved on the memory of an internet server such that there are multiple points of access to the information.

As noted above, the functionality of the control device 200 may be embedded in a mobile device, such as a smart phone, and the user may then access communications from the tagged receiver, and transmits communications to the tagged receiver through an application interface that operates over the network 222. As such, the control device 200 as described herein may be a mobile device such as a smart phone, a laptop computer, tablet, etc. Therefore, the terms control device and mobile device may be used interchangeably.

In some embodiments, the control device 200 does not include all of the components depicted in FIG. 4. Furthermore, in some embodiments, the control device 200 includes additional components other than those depicted in FIG. 4.

Figure 8:
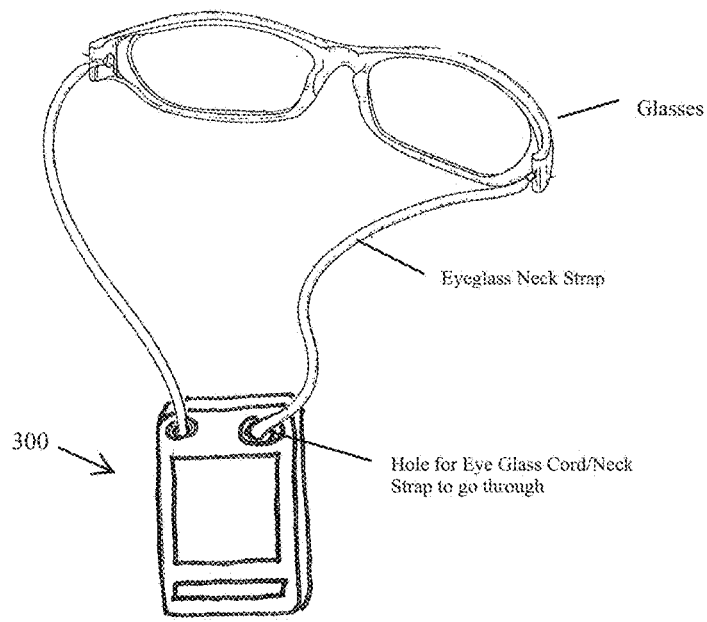
FIG. 8 illustrates a pair of glasses with a tag receiver attached thereto, according to one or more embodiments shown and described herein.
Figure 9:
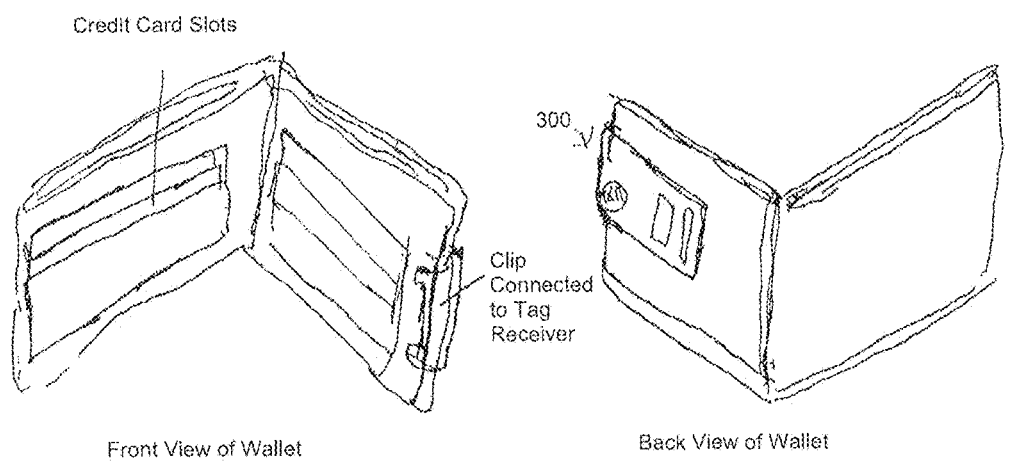
FIG. 9 illustrates a front a rear view of a wallet with a tag receiver attached thereto, according to one or more embodiments shown and described herein.
Figure 11A:
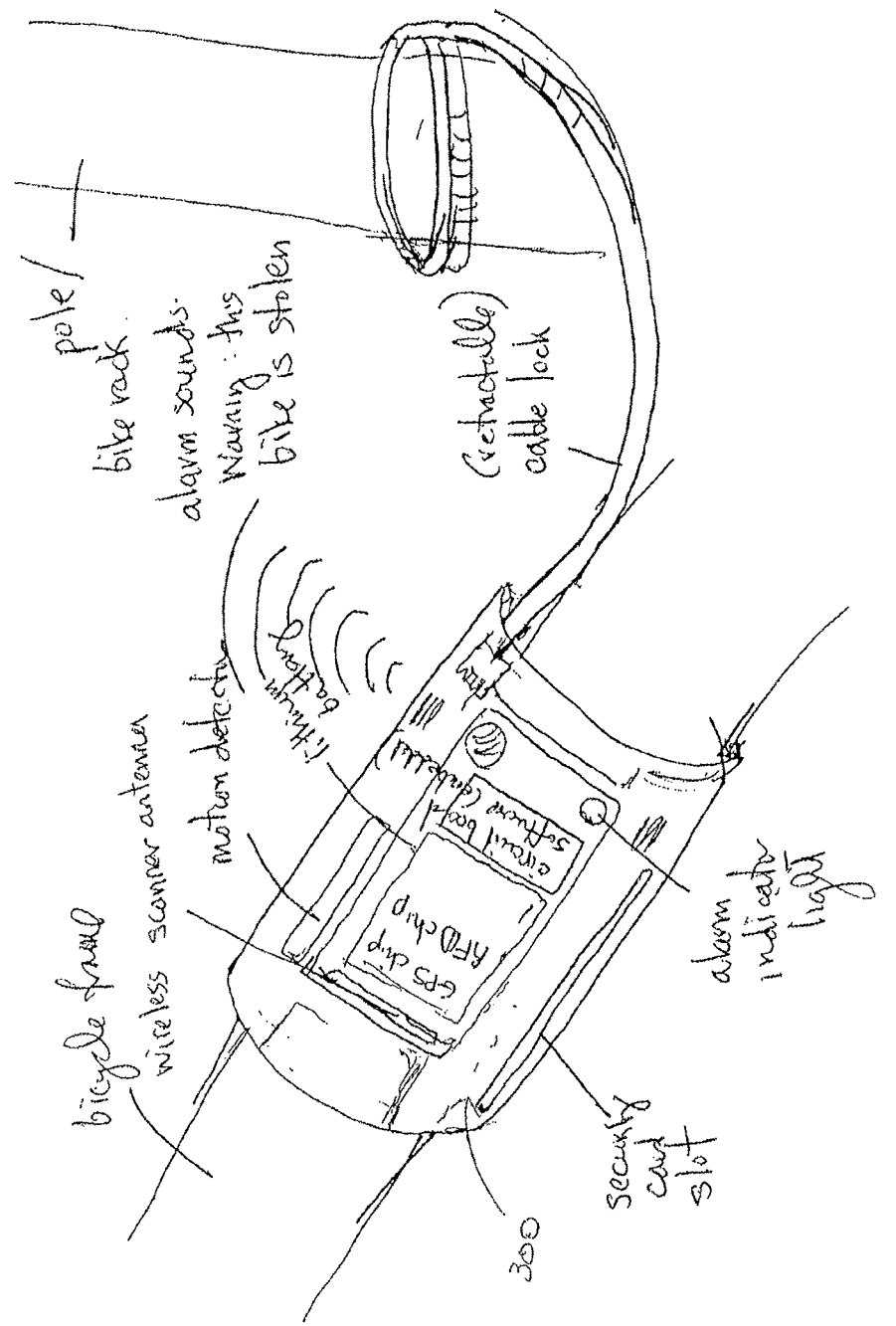
FIG. 11A illustrates a detailed view of the tag receiver of FIG. 10, according to one or more embodiments shown and described herein.
Figure 11B:
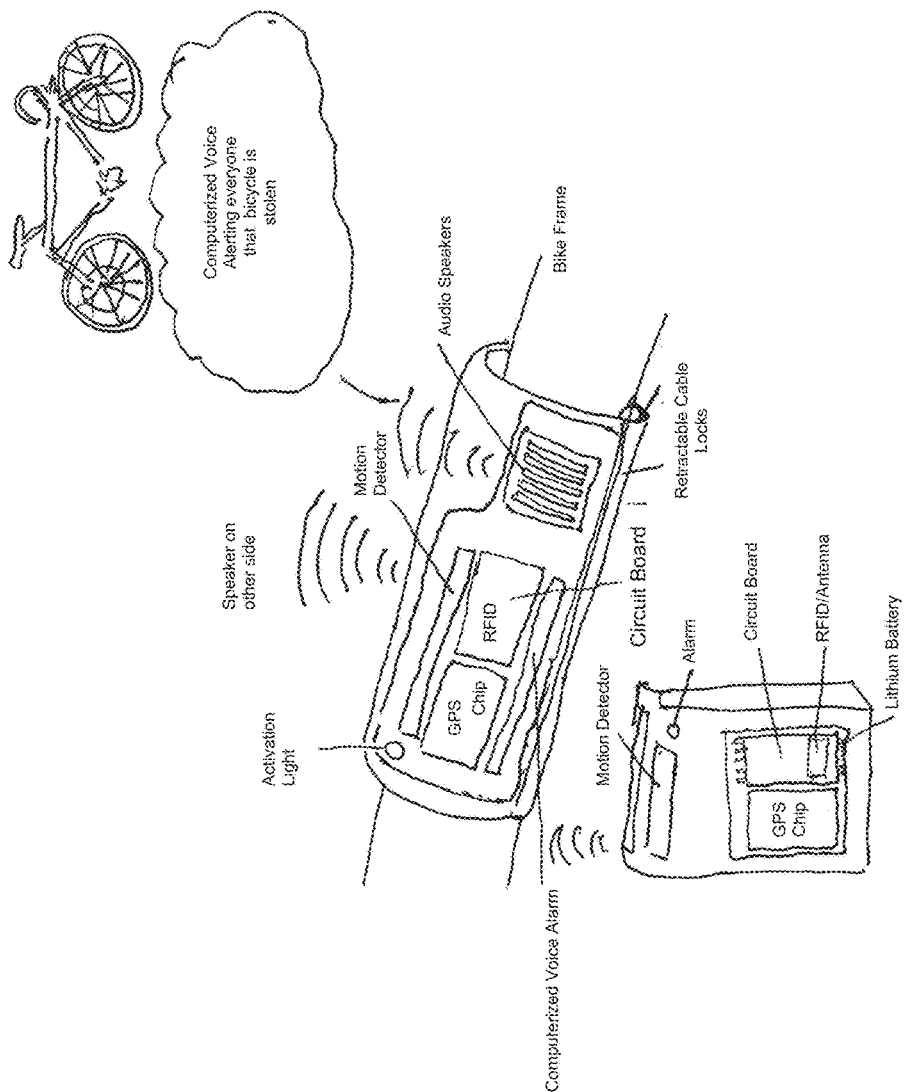
FIG. 11B illustrates the tag receiver of FIGS. 10 and 11A issuing an alarm, according to one or more embodiments shown and described herein.
Figure 13:
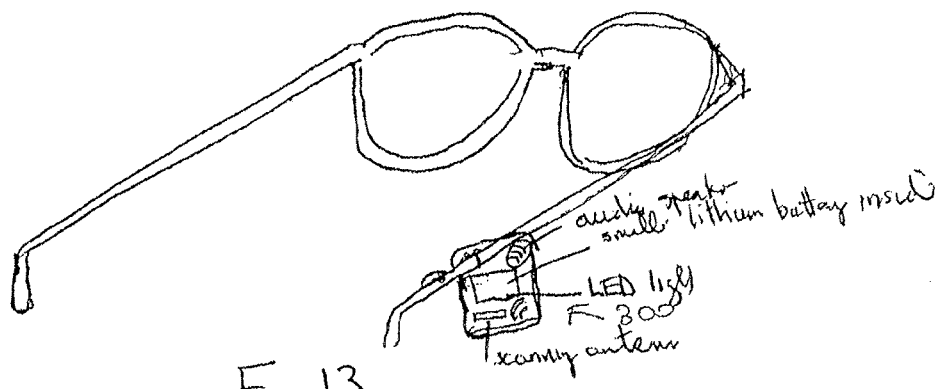
FIG. 13 illustrates a pair of glasses with a tag receiver attached thereto, according to one or more embodiments shown and described herein.
Figure 14:
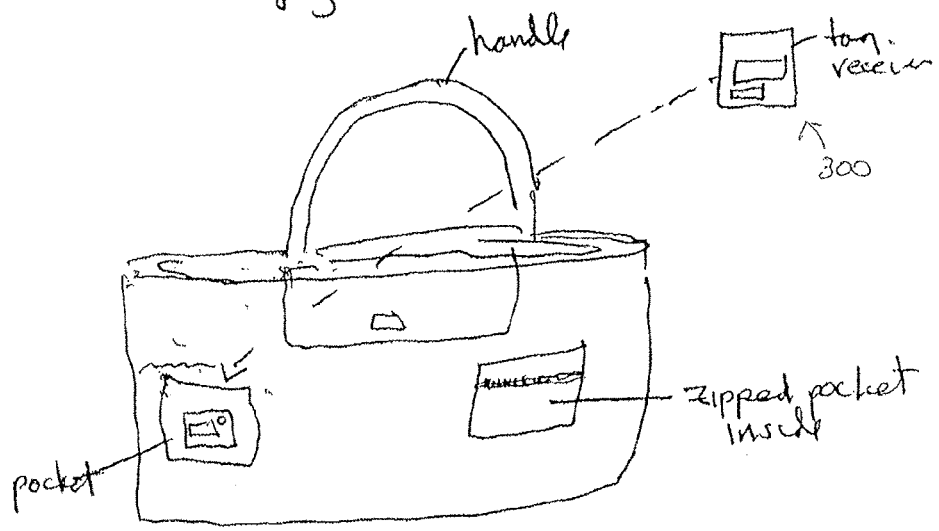
FIG. 14 illustrates a purse with a tag receiver attached thereto, according to one or more embodiments shown and described herein.
Figure 15:
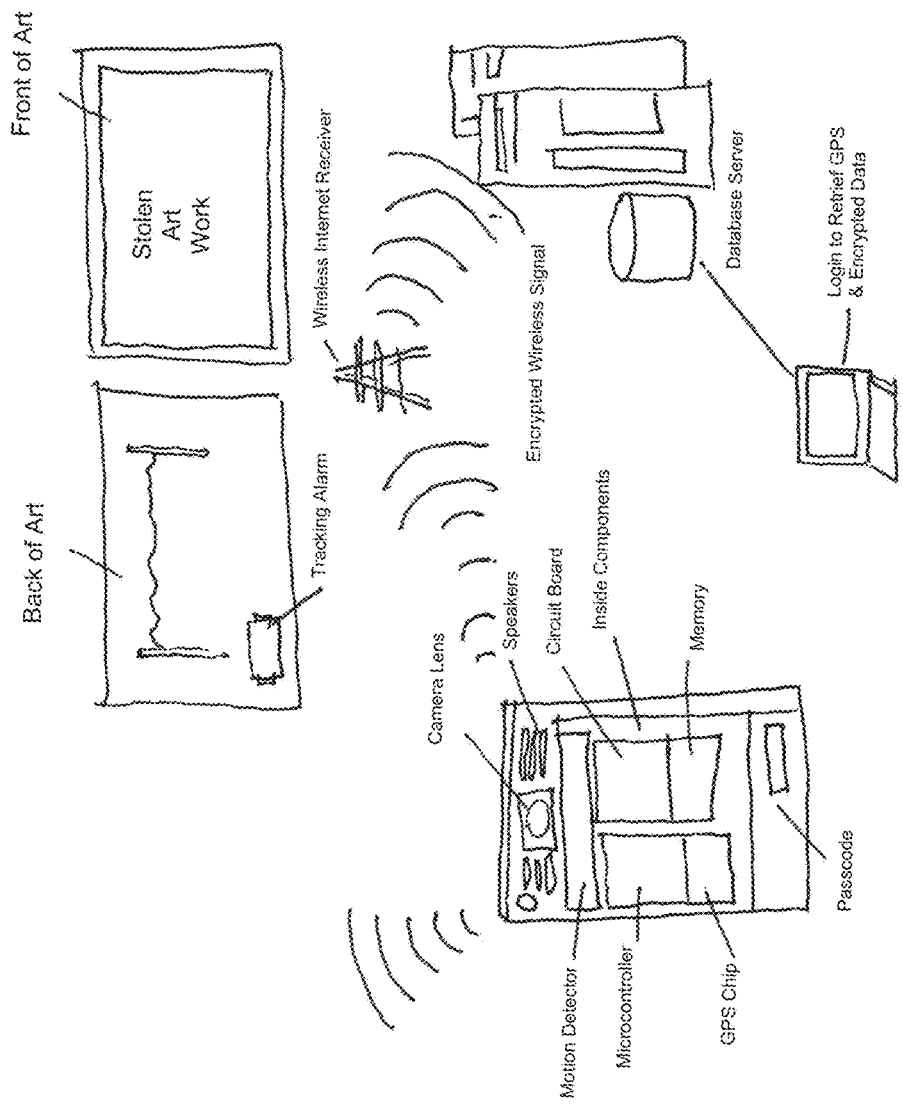
FIG. 15 schematically depicts a piece of art with a tag receiver attached thereto transmitting a signal, according to one or more embodiments shown and described herein.

Referring now to FIGS. 5A-15, the drawings illustrate tagged receivers, according to one or more embodiments disclosed herein. Tagged receivers may be attached to a variety of assets in order to track their locations or send an alert that the asset has been tampered with. In some embodiments, a tagged receiver could be disposed on a set of keys through a hole extending the body of the tagged receiver (FIGS. 5A and 5B). Similarly the hole could be used to attach the tagged receiver to a neck strap for a pair of eyeglasses (FIG. 8). In other embodiments the tagged receiver comprises a clip coupled to a clip slot such as to allow the tagged receiver to be clipped to various assets including but not limited to: cellular phones (FIGS. 6 and 7), wallets (FIG. 9), etc. In further embodiments, the tagged receiver may be secured to a bicycle through a clamp coupled to the bicycle frame (FIGS. 10-12). In still further embodiments, the tagged receiver may have a reduced size for attachment to smaller assets such as a frame of a pair of glasses or a purse. In still further embodiments, the tagged receiver may be attached to a larger asset such as a work of art (FIG. 15).

Figure 16:
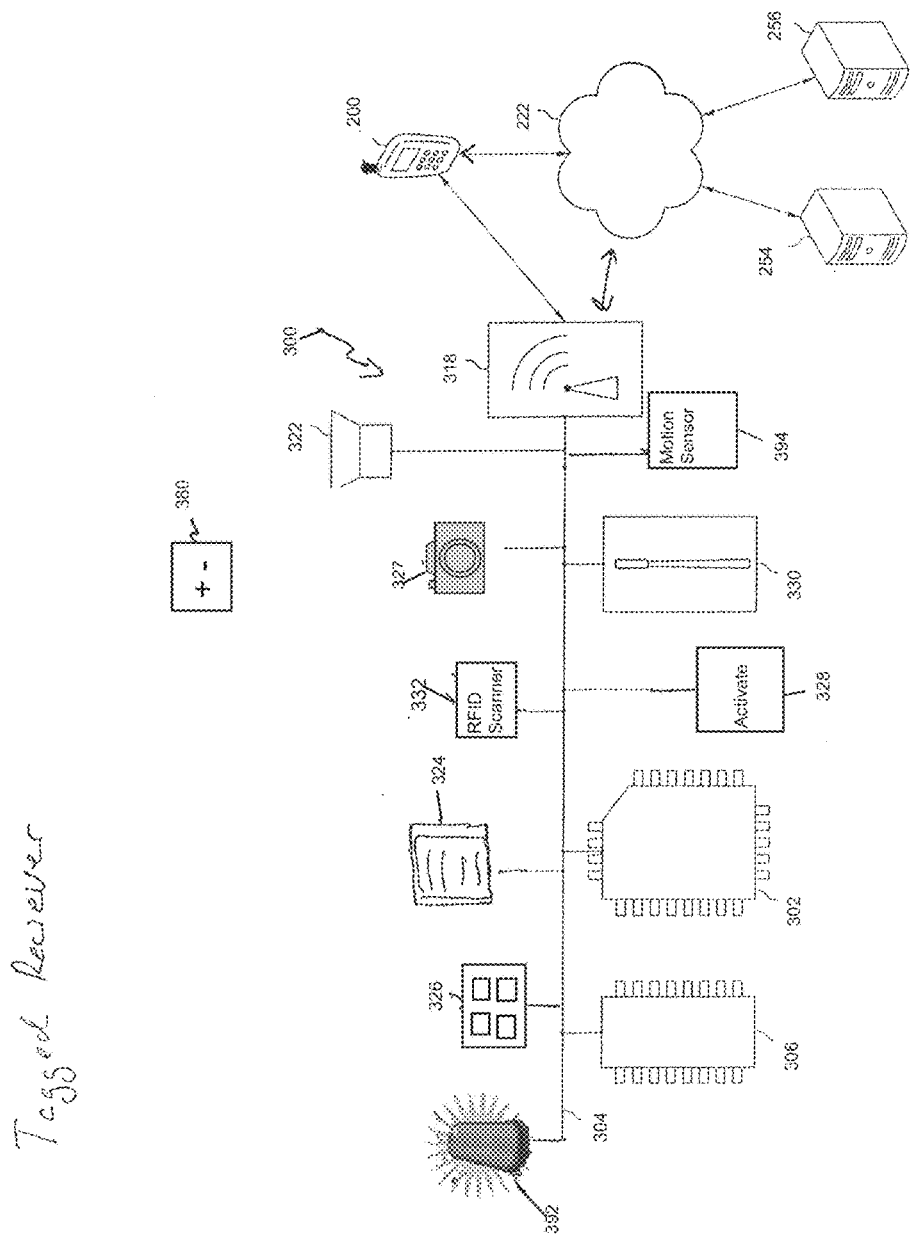
FIG. 16 schematically depicts a tagged receiver, according to one or more embodiments shown and described herein.

Referring now to FIG. 16, the tagged receiver 300 includes one or more processors 302, a power supply 380 (e.g., a battery), a communication path 304, one or more memory modules 306, an alarm light indicator 392, a speaker 322, an activation switch 328, network interface hardware 318, an RFID scanner 332, one or more motion sensors 394, a display 324, tactile input hardware 326, a camera (that may include video recording capabilities) 327, network interface hardware 318, and a satellite antenna 330. The various components of the tagged receiver 300 and the interaction thereof will be described in detail below.

As noted above, the tagged receiver 300 includes the power supply 380 (see FIG. 5B for an example in which the power supply 380 is a battery). The power supply may be a battery and more specifically, a lithium battery that supplies power to the different components of the control device 200. In some embodiments, the battery is a 1000 mAh Lithium Polymer (LiPo) Battery with an integrated PCM controller. The power supply may include embedded chips. The chips may be one of a RFID chip, a GPS chip, a Bluetooth® chip, or a combination thereof.

As noted above, the tagged receiver 300 includes the communication path 304. The communication path 304 may be formed from any medium that is capable of transmitting a signal such as, for example, conductive wires, conductive traces, optical waveguides, or the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 304 communicatively couples the various components of the tagged receiver 300. As used herein, the term "communicatively coupled" means that coupled components are capable of exchanging data signals with one another such as, for example, electrical signals via conductive medium, electromagnetic signals via air, optical signals via optical waveguides, and the like.

As noted above, the tagged receiver 300 includes the one or more processors 302. Each of the one or more processors 302 may be any device capable of executing machine readable instructions. Accordingly, each of the one or more processors 302 may be a controller, an integrated circuit, a microchip, a computer, or any other computing device. The one or more processors 302 are communicatively coupled to the other components of the tagged receiver 300 by the communication path 304. Accordingly, the communication path 304 may communicatively couple any number of processors with one another, and allow the modules coupled to the communication path 304 to operate in a distributed computing environment. Specifically, each of the modules may operate as a node that may send and/or receive data.

As noted above, the tagged receiver 300 includes the one or more memory modules 306. Each of the one or more memory modules 306 of the tagged receiver 300 is coupled to the communication path 304 and communicatively coupled to the one or more processors 302. The one or more memory modules 306 may comprise RAM, ROM, flash memories, hard drives, or any device capable of storing machine readable instructions such that the machine readable instructions can be accessed and executed by the one or more processors 302. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 306 may include one or more RFID decoder algorithms, such as an automatic RFID code recognition engine that processes RFID input signals received from the RFID scanner 332 and/or extracts information from such signals, as will be described in further detail below. Furthermore, the one or more memory modules 306 include machine readable instructions that, when executed by the one or more processors 302, cause the tagged receiver 300 to perform the actions described below.

In some embodiments, the one or more memory modules 306 may include geo-fencing coding such that when actuated on the one or more processors a virtual barrier is constructed. As such, when the tagged receiver 300 with the asset attached thereto enters or leaves the virtual barrier, the processor may act to initiate an alarm in one of the embodiments described herein.

As noted above, the tagged receiver 300 comprises the speaker 322 for transforming data signals from the tagged receiver 300 and/or the control device 200 into mechanical vibrations, in order to output audible prompts or audible information from the tagged receiver 300. The speaker 322 is coupled to the communication path 304 and communicatively coupled to the one or more processors 302. When actuated by the one or more processors 302, the speaker 322 may output an alert indicating that the asset to which the tagged receiver 300 is attached is either being stolen or tampered with. The speaker may comprise at least a 100 db output.

The alert may comprise one of a computerized voice, an alarm tone, or a combination thereof. In further embodiments, the one or more memory modules 306 comprise machine readable instructions to emit object specific alarms when the alert is actuated. For example, the one or more memory modules 306 are pre-programmed with various valuable objects (e.g. plasma, bicycle, painting, etc.) and the user selects which object he wants to secure from a keypad by entering the corresponding ID number that the object is associated with. If the alarm goes off, it can repeatedly emit in a high decibel frequency "Alert! Alert! This <type of object chosen> is stolen! Please contact the police. The user may also enter their phone number so that it says "Please call <phone number of owner>". The user can program certain aspects of the device (similar to a VCR.), including but not limited to the time that the alarm is to be activated. The alarm can also be programmed in foreign languages so it can be used in other countries. As noted herein the alarm can be activated remotely through the control device 200 as described.

Some embodiments may include real-time alerts and notifications sent directly from the tagged receiver to local police that include a description of the stolen asset, the location of the asset, and the contact details of the owner. These alerts may consist of encrypted data that are sent over a wireless network that could interface with police databases, networks, and email servers as well as third-party databases, networks, and website servers such as those that list and monitor stolen or missing assets such as fine art, jewelry, and bicycles. Such data transmission and network interfacing could be achieved through IP locator configuration, network adapters, and application programming interfaces (APIs) between the network interface hardware in the tagged receiver 300 and that controlled by the third-party so as to be communicatively coupled. In such embodiments, access to a third-party server would typically require remote login security credentials (sent as programmed encrypted data from the tagged receiver 300) which would be provided to the user by the third-party.

In some embodiments, the speaker 322 may have an amplifier attached thereto. The amplifier may be communicatively coupled to the tagged receiver 300, but may be a separate component. In some embodiments, a casing for the tagged receiver 300 may be provided (an example of which is shown in FIG. 10, wherein the sound is emitted from a casing). The casing will be described in greater detail below.

As noted above, the tagged receiver 300 comprises the alarm light indicator 392 for transforming data signals from the control device 200 and/or the tagged receiver 300 into an illuminated signal in order to output visual alarm indications to the user. In some embodiments, the alarm light indicator is an LED light. The alarm light indicator may allow a user to know when an alarm is set. For example, when a user indicates that the alarm is on, the alarm light indicator may blink. Similarly, the alarm light indicator 292 on the control device 200 (see FIG. 2) may blink or remain lit when the control device 200 senses an alarm event that causes the alarm of a tagged receiver 300 to go off.

Still referring to FIG. 16, as noted above, the tagged receiver 300 comprises tactile input hardware 326 coupled to the communication path 304 such that the communication path 304 communicatively couples the tactile input hardware 326 to other modules of the tagged receiver 300. The tactile input hardware 326 may be any device capable of transforming mechanical, optical, or electrical signals into a data signal capable of being transmitted with the communication path 304. Specifically, the tactile input hardware 326 may include any number of movable objects that each transform physical motion into a data signal that can be transmitted to over the communication path 304 such as, for example, a button, a switch, a knob, a microphone or the like.

The tactile input hardware 326 may include an alarm activation button, such that the tagged receiver 300 emits an alarm to help locate the asset to which the tagged receiver 300 is affixed. The tactile input hardware 326 may further include a passcode entry system. The passcode entry system may comprise a keypad on which a user may enter a passcode to initiate or deactivate the alarm. In further embodiments, the passcode entry system may comprise a security card that must be inserted into one of the tagged receiver 300 or the tagged receiver casing. In further embodiments, the passcode entry system may comprise a scanner communicatively coupled to the one or more processors 302 of the tagged receiver 300. The scanner may be retina scanner or a finger print scanner. In yet further embodiments, the passcode entry system may also consist of user voice recognition identification. Use of one of these passcode entry systems is not necessarily mutually exclusive of the others. In either case, the one or more memory modules 306 may comprise machine readable instructions to recognize the unique finger print, retinal scan, or voice of an individual user, the one or more processors 302 may then actuate the alarm based thereon. In even further embodiments, the tactile input hardware 326 may include a switch that remains in a depressed position so long as the tagged receiver 300 is attached to an asset. When the tagged receiver 300 is removed from the asset while the alarm is in an activated state, the switch may extend and set the alarm off.

Still referring to FIG. 16, as noted above, the tagged receiver 300 comprises the 328 for activating or interacting with the tagged receiver 300. In some embodiments, the activation switch 328 is an electrical switch that generates an activation signal when flipped, such as when the activation switch 328 is flipped by a user when the user desires to utilize or interact with the tagged receiver 300. The activation switch 328 is concealed on or within the body of the tagged receiver 300 such that the activation switch 328 cannot be reached while the tagged receiver 300 is armed. In some embodiments, the activation switch 328 is located within a removable body panel, the tampering of which will set off the alarm. In some embodiments, the activation switch 328 is located behind or concealed by a removable body panel.

As noted above, the tagged receiver 300 includes the network interface hardware 318 for communicatively coupling the tagged receiver 300 with a computer network 222 and/or the control device 200. The network interface hardware 318 is coupled to the communication path 304 such that the communication path 304 communicatively couples the network interface hardware 318 to other modules of the tagged receiver 300. The network interface hardware 318 can be any device capable of transmitting and/or receiving data via a wireless or cellular network. Accordingly, the network interface hardware 318 can include a communication transceiver for sending and/or receiving data according to any wireless communication standard. For example, the network interface hardware 318 may include a chipset (e.g., antenna, processors, machine readable instructions, etc.) to communicate over wireless computer networks such as, for example, wireless fidelity (WiFi), WiMax, Bluetooth, IrDA, Wireless USB, Z-Wave, ZigBee, or the like. In some embodiments, the network interface hardware 318 includes a Bluetooth transceiver that enables the tagged receiver 300 to exchange information with the control device 200 via Bluetooth communication.

Still referring to FIG. 16, data from the tagged receiver 300 may be provided to the control device 200 via the network interface hardware 318. Specifically, the tagged receiver 300 may include an antenna for communicating over one or more of the wireless computer networks described above. Moreover, the tagged receiver 300 may include an antenna for communicating with the network 222.

As noted above, the tagged receiver 300 includes a satellite antenna 330 coupled to the communication path 304 such that the communication path 304 communicatively couples the satellite antenna 330 to other modules of the tagged receiver 300. The satellite antenna 330 is configured to receive signals from global positioning system (GPS) satellites. Specifically, in one embodiment, the satellite antenna 330 includes one or more conductive elements that interact with electromagnetic signals transmitted by GPS satellites. The received signal is transformed into a data signal indicative of the location (e.g., latitude and longitude) of the tagged receiver 300, by the one or more processors 302. Additionally, it is noted that the satellite antenna 330 may include at least one of the one or more processors 302 and the one or memory modules 306. The data received through the GPS satellites may be stored in one of the one or more memory modules 306 of the tagged receiver 300, one or more memory modules 206 of the control device 200, the server memory, or a combination thereof. As such, there will be multiple access points to the location data of a tagged receiver 300 received from the tagged receiver 300. Furthermore, the network interface hardware 318 may be configured to transmit the location data of the tagged receiver 300 over the internet in an encrypted format. As such, the user and or anyone authorized, such as the police, may access the location data transmitted from the tagged receiver 300.

As noted above, the tagged receiver 300 further includes one or more motion sensors 394 configured to sense a motion of the tagged receiver 300 or the tampering therewith. In circumstances where the alarm is actuated, the one or more processors 302 may execute machine readable instructions to emit an alarm as described herein.

The tagged receiver 300 may optionally comprise the display 324 for providing visual output such as, for example, information relating to a location and status of assets. The display 324 is coupled to the communication path 304 and communicatively coupled to the one or more processors 302. Accordingly, the communication path 304 communicatively couples the display 324 to other modules of the tagged receiver 300. The display 324 may include any medium capable of transmitting an optical output such as, for example, a cathode ray tube, light emitting diodes, a liquid crystal display, a plasma display, or the like. Moreover, the display 324 may be a touch screen that, in addition to providing optical information, detects the presence and location of a tactile input upon a surface of or adjacent to the display 324. Accordingly, the display 324 may receive mechanical input directly upon the optical output provided by the display 324. For example, input a passcode on a digital keypad.

As indicated above, the tagged receiver 300 may further include a camera 327 (or other imaging device) that automatically snaps pictures when the alarm goes off in response to an alarm event, as described herein. The camera 327 is coupled to the communication path 304 and communicatively coupled to the one or more processors 302. Accordingly, when the tagged receiver 300 emits an alarm per the machine readable instructions executed by the one or more processors 302, the one or more processors 302 automatically execute machine readable instructions to actuate the camera 327 to automatically take pictures or record video throughout the alarm event. The pictures or video may then be uploaded, through the network interface hardware 318 of the tagged receiver 300 to the network 222 and stored in one of the one or more memory modules 206 of the control device 200, the memory of the servers, or a combination thereof. The pictures or video may be viewed on the display 224 of the control device 200 or through the application as described herein. In some embodiments, the pictures and/or video is wirelessly transmitted and uploaded to a third-party server.

In some embodiments, the tagged receiver 300 does not include all of the components depicted in FIG. 16. Furthermore, in some embodiments, the tagged receiver 300 includes additional components other than those depicted in FIG. 16.

Referring now to FIGS. 10-14, the tagged receiver 300 may attach to various assets through the use of a casing. The casing may be shaped to fit a variety of objects and may comprise a card reader, such that a security card may be used to activate and deactivate the alarm (shown in FIGS. 10-13). In such embodiments, an electronic lock of the casing is removably coupled to the communication path 304 and removably communicatively coupled to one or more processors 302 or the tagged receiver 300. In some embodiments, the electronic lock includes an associated passcode entry key system. In some embodiments, the electronic lock is locked or unlocked in response to user input received by a passcode entry key system separate from the electronic lock. In some embodiments, when the user contacts the security card with the card reader, the one or more processors 302 execute logic to do one of activating the alarm, deactivating the alarm, unlocking the casing, or a combination thereof. As such only the user with the security card may remove the tagged receiver 300 from the asset. In other embodiments, instead of the card reader, the mount may comprise a tactile user interface as described herein to enter a passcode directly into the casing (as shown in FIG. 12).

In some embodiments, the casing may be a band that is attached to a person or child's wrist. In such embodiments, the band may have a locking mechanism that is password protected with a security passcode. In this embodiment, the activation switch 328 of the tagged receiver 300 may be activated by the wearer to alert bystanders and authorities as to situations such as but not limited to a possible abduction.

In some embodiments, the casing may comprise a slot area where the tagged receiver 300 may be secured by a locking mechanism, which fastens the tagged receiver 300 to the casing. In further embodiments, the casing comprises a cable that will activate the alarm if the locking mechanism is broken. In some embodiments, the chain or cable may be retractable from the casing and can be securely looped around a fixed immovable object such as a pole or bicycle rack and back into the casing. The cable may then be secured into a locking mechanism of the casing. When the cable is secured in the locking mechanism of the casing, some embodiments will have a locked notification alert sent to the user's control device display and/or a locked indicator light on the casing will be lit. In some embodiments that include a retractable chain or cable, an alarm event will be triggered when the retractable chain or cable is detected to be broken or tampered with.

In some embodiments, the enclosure of the tagged receiver may be made from an impact modified engineering polymer capable of withstanding cold and hot temperatures from −40 C/F to 40 C/112 F. The enclosure may be assembled with tamper proof screws that are irremovable without destruction of the enclosure and case. The tagged receiver can have the option for affixing itself to the asset with tamper resistant screws to prevent easy removal without a specific tool. The tagged receiver may also have alternative options for affixing itself to the asset such as with 3M Semi Permanent Acrylic VHB tape.

In some embodiments, the casing may comprise a deadman trigger switch that is coupled to the communication path 304 and communicatively coupled to the one or more processors 302 of the tagged receiver 300. Thus, when the casing and the tagged receiver 300 are attached to an asset, the dead-man trigger will be depressed against the asset. Should the case and tagged receiver 300 be forcefully removed, the dead-man trigger switch will extend and the processor will execute machine readable instructions to set off the alarm. In further embodiments, the casing comprises side mounted security pins that are enabled with a sensor to indicate the pins have been tampered. Thus, when the sensor sensors the side mounted security pins are being tampered with, the one or more processors 302 of the tagged receiver 300 will execute machine readable instruction to set off the alarm.

Figure 17:
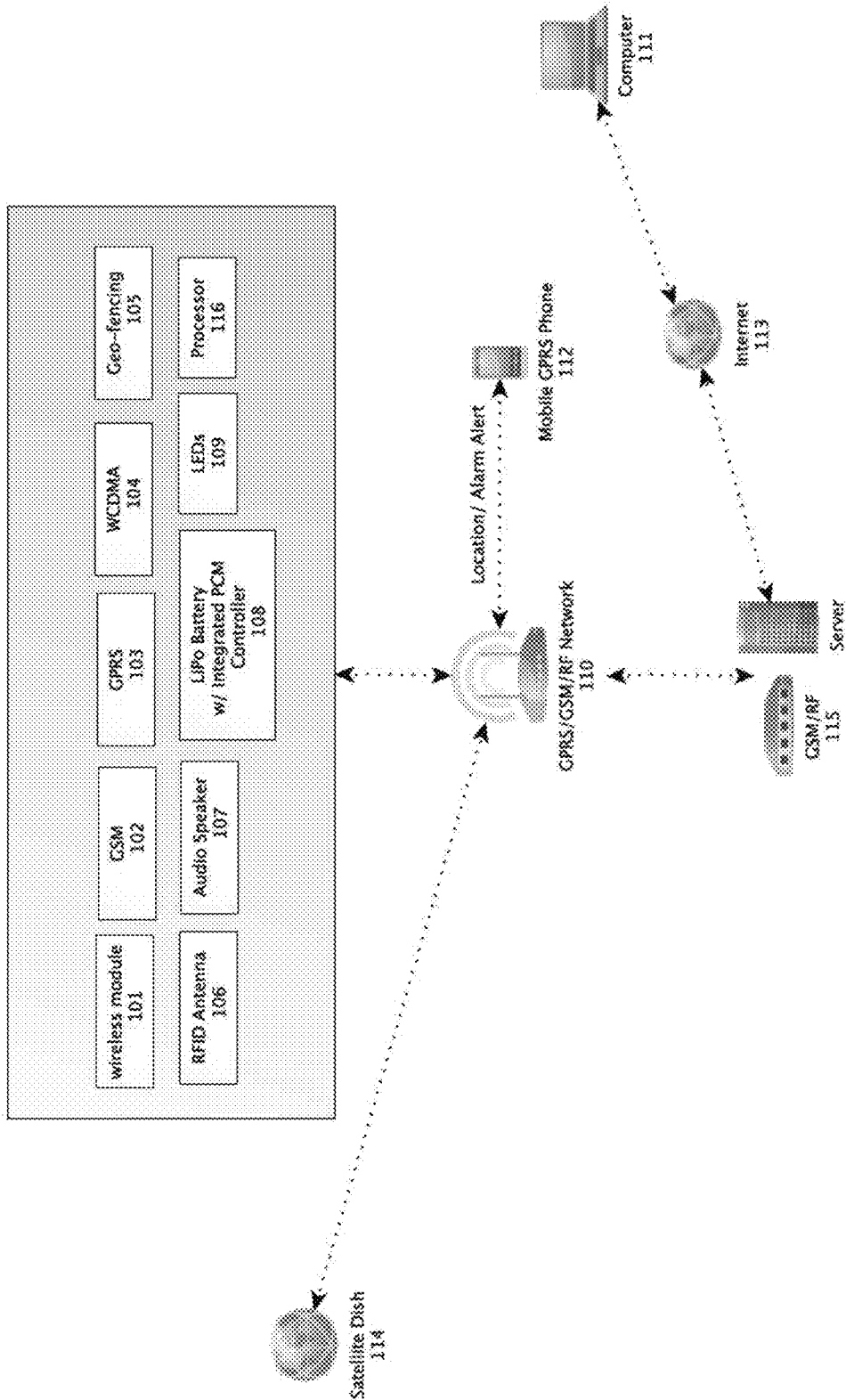
FIG. 17 schematically depicts a multi-modal tracking locator alarm system and communication network, according to one or more embodiments shown and described herein.

FIG. 17 provides an alternative embodiment the interconnections of the tagged receiver as shown in FIG. 17 and provides substantially the same features.

Figure 19:
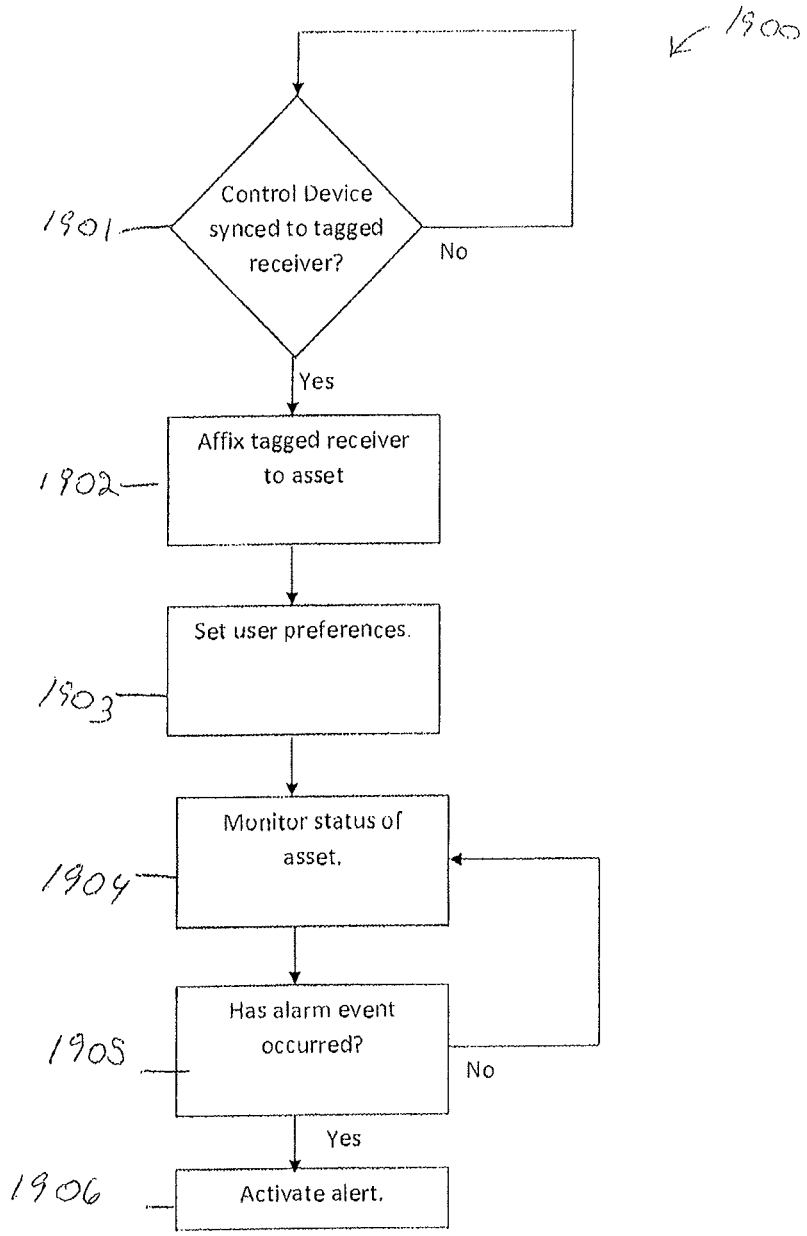
FIG. 19 depicts a flow diagram of the arming of a tagged receiver, according to one or more embodiments shown and described herein.

FIG. 19 depicts a flowchart describing the process of arming the multi-modal tracking locator alert system. Referring to block 1901, the control device 200 syncs with the tagged receiver 300. In an embodiment of the tagged receiver 300 equipped with RFID functionality, when a user wishes to track, locate, or set an alert on an asset, the user may scan an RFID tag of the tagged receiver 300 using the RFID scanner of the control device 200. In other embodiments, both the control device 200 and the tagged receiver 300 may be Bluetooth enabled and sync using a Bluetooth pairing process. However, it should be understood that in other embodiments the control device 200 may be synced with the tagged receiver 300 in any other manner that enables the control device 200 and the tagged receiver 300 to communicate via network 222. Once the control device 200 and the tagged receiver 300 are synced, the tagged receiver 300, or the asset attached thereto, may be displayed on the display 224 of the control device 200. While syncing the control device 200 and the tagged receiver 300 is depicted as the first step in the flowchart of FIG. 19, in other embodiments, the link may be established later.

In block 1902, the tagged receiver 300 is affixed to an asset to be secured. As shown in FIGS. 5A-15 and described above, the tagged receiver 300 may be affixed to an asset in a variety of ways including threading the asset through a provided hole, using a clip, or a casing as described above. While affixing the tagged receiver 300 to the asset is depicted as the second step in the flowchart of FIG. 17, in other embodiments, the tagged receiver 300 may be affixed to the asset earlier or later in the process.

In block 1903, user preferences are entered into the control device 200 to set a variety of parameters regarding the asset. For instance, the user may input, with the tactile input hardware 226 of the control device 200 any information about the asset to which the tagged receiver 300 is attached, such as, but not limited to, the name of the asset, motion sensor limitations, geo-fencing limitations, time parameters, and the type of alarms to be used in case of an alert event. In some embodiments, the control device 200 is pre-programmed with various objects to which a tagged receiver 300 may be attached. As such, the user may select the asset to be secured from one of the pre-programmed asset, or the user may enter in a new asset using the tactile input hardware 226 of the control device 200. In other embodiments, a user may download and install a pre-programmed app on the user's smart phone/mobile device (which may serve as the user's control device) to change user settings, parameters, and preferences on the tagged receiver. The app, utilizing Bluetooth, WiFi, RFID, and/or GPS chips communicatively coupled with the networking hardware of the smart phone or mobile device, can communicate with the tagged receiver once it is synced and paired to the network of the smart phone/mobile device. However, it should be noted that the invention is not cell-phone dependent. Should the alarm go off, the processor may execute machine readable instructions to emit a voice alarm personalized to the asset as described above. Furthermore, the user may customize the motion sensors to cause an alarm to go off when the asset experiences a predetermine amount of movement. The geo-fencing feature uses GPS or RFID functionality to define geographical boundaries like a virtual barrier. As such, an alarm may go out when the asset goes beyond the virtual barrier. Once the user preferences are set, the alarm of the tagged receiver 300 is armed. The alarm indicator light on the tagged receiver 300 will, in some embodiments, light to give a visual warning that the alarm of the tagged receiver 300 is armed.

In blocks 1904 and 1905, the control device 200 monitors a status of the secured asset. For example, the control device 200 monitors, using its network interface hardware 218, the tagged receiver 300 for any signals emitted over the network 222 indicative of an alert event. The control device 200 may continuously monitor the status of the device until an alert event occurs. Should an alert event occur, the alarm may be activated, block 1906.

Figure 18:
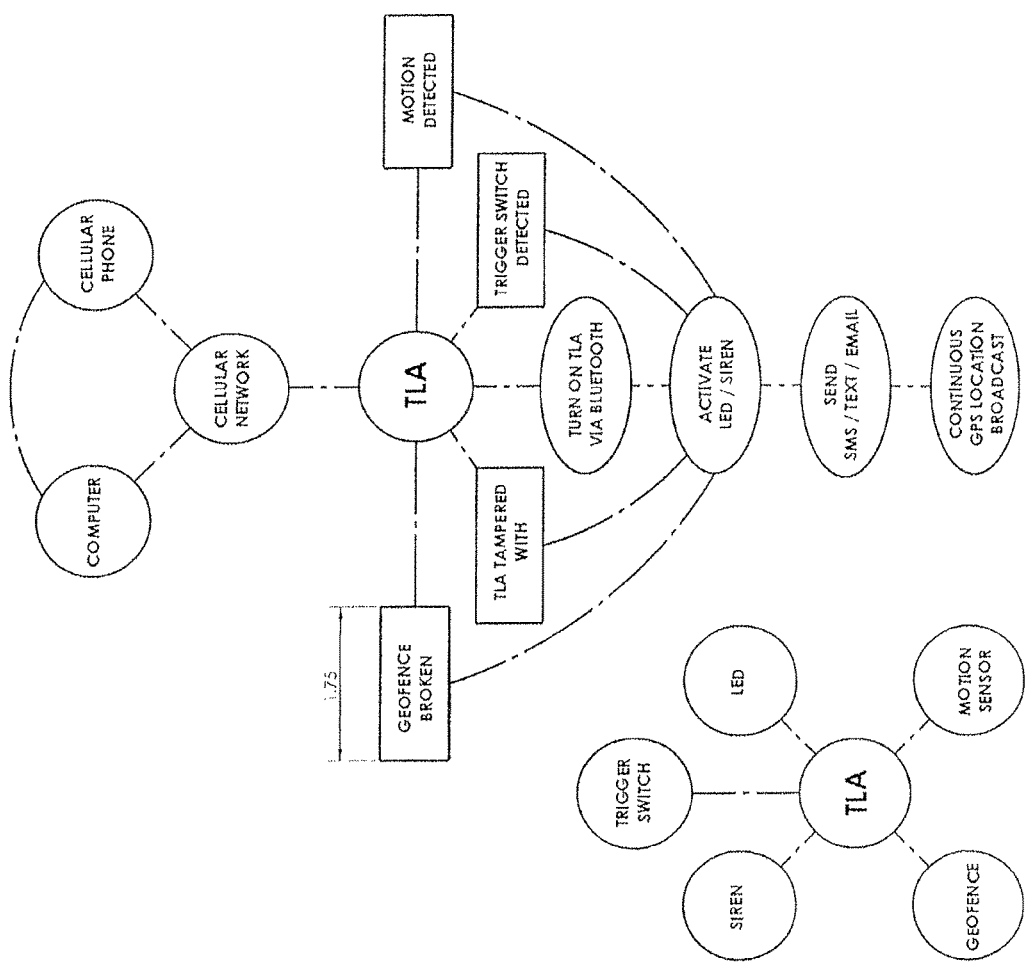
FIG. 18 schematically depicts a communication network for a multi-modal tracking locator alarm system in regards to a variety of triggering events, according to one or more embodiments shown and described herein.
Figure 20:
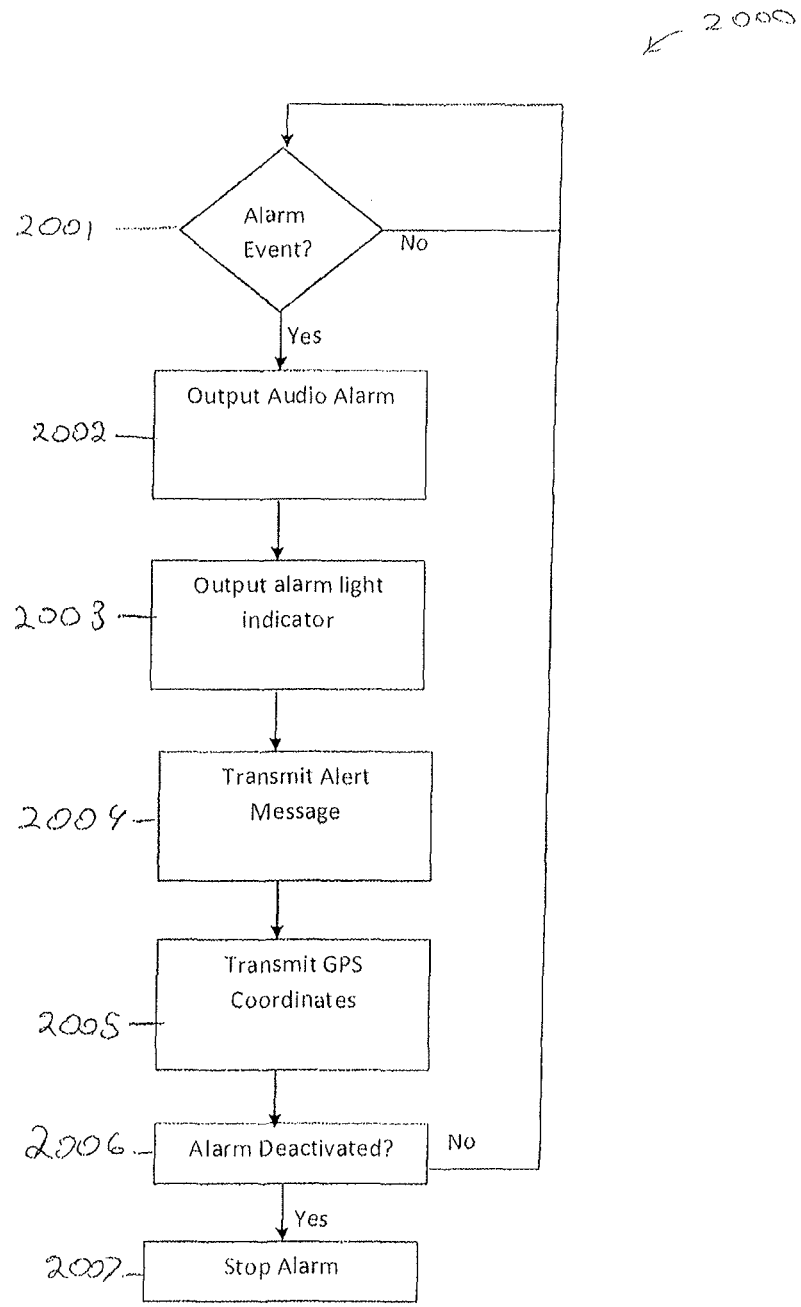
FIG. 20 depicts a flow diagram of a tagged receiver activating an alert in response to an alarm event, according to one or more embodiments shown and described herein.

FIG. 20 depicts a flowchart of the process through which the multi-modal tracking locator alert system executes during an alert event (block 2001) according to embodiments disclosed herein. An alert event may be a variety of events including but not limited to: the secured asset passing outside of the set geo-fence, a sensor detecting motion of the asset, the dead man switch being activated, a sensor detecting a tampering with the casing, or the remotely setting off the alarm through the control device 200. During the alert the tagged receiver 300 will output the audio alarm as described herein (block 2002), cause the alarm lit indicator to intensify and or strobe (block 1803), transmit a message sent of the event to the user and or the police (block 2004), transmit GPS coordinates to the user and or the police (block 2005). Once an alarm event has occurred, the audio alarm (including, but not limited to, computerized voice alerts) and the alarm light indicator will not stop until turned off (block 2006) until deactivated by the user. Even if a perpetrator finds the activation switch 328 of the tagged receiver 300, the alarms will continue until turned off using the passcode, keycard, or control device 200 as described in the various embodiments. As such, the alarms may continue until the batteries of the tagged receiver 300 have died. Or the alarm has been turned off by the user (block 2007). Referring briefly to FIG. 18, FIG. 18 provides another illustration of the communication paths when the alarm event occurs.

As described above, in some embodiments, once the alarm is activated, the camera 327 (as described herein) automatically snaps pictures or records video clips of the vicinity of the tagged receiver 300. The images are uploaded through the network interface hardware 318 of the tagged receiver 300 to control device 200 and/or the server and stored in a database. The police, a third-party monitor, or the user can login into the Internet server and retrieve the location of the asset and the images snapped should the user not have the control device 200. The user or the police may activate or deactivate the device remotely with the control device 200 or over the internet server.

In some embodiments, if the battery power is low in the tagged receiver, the user will receive notification on their control device display indicating that the tagged receiver has low battery power. The tagged receiver may further comprise a built-in charging station allowing the user to recharge the battery of the tagged receiver. Example charging stations could be, but are not limited to, a USB port, and a DC jack.

In some embodiments, the control device further includes a built-in digital compass with magnetic sensors (e.g., with a plurality of magnetoresistive elements connected in series) that direct the user to the exact location of a tracked object so that the user does not have to spend a lot of time finding the object once he knows the general geographic location of the object shown on a map. The tagged receiver may include a magnet that emits a magnetic field that can be detected by the magnetic sensors in the control device. As the user gets closer, the control device will alert the user through alerts or computerized voice output that the user is getting closer. For example, the compass may be activated once the user (with the control device) is in the geographic vicinity of the tagged receiver 300 on the asset. The user may be directed to the location of the asset once the user is in the geographic vicinity of the asset. For example, in some embodiments, the speaker may output speech directions to the user, e.g. "Go right, go north, go northeast" etc.

In some embodiments, the tagged receiver conserves power consumption, prolonging its battery life, by going into a sleep mode until the asset is touched.

In some embodiments, the tracking locator alarm system maintains a history of the movement of the tracked object and estimates the speed and acceleration of the object based on the distance between location points and the movement time between the different location points. Some embodiments may include an accelerometer to give more precise measurements. The movement history may be stored remotely on a server or viewed in real-time on a map like Google Earth/Maps if the object is moving.

Various additional embodiments of tagged receivers are presented in FIGS. 21-35.

Figure 21:
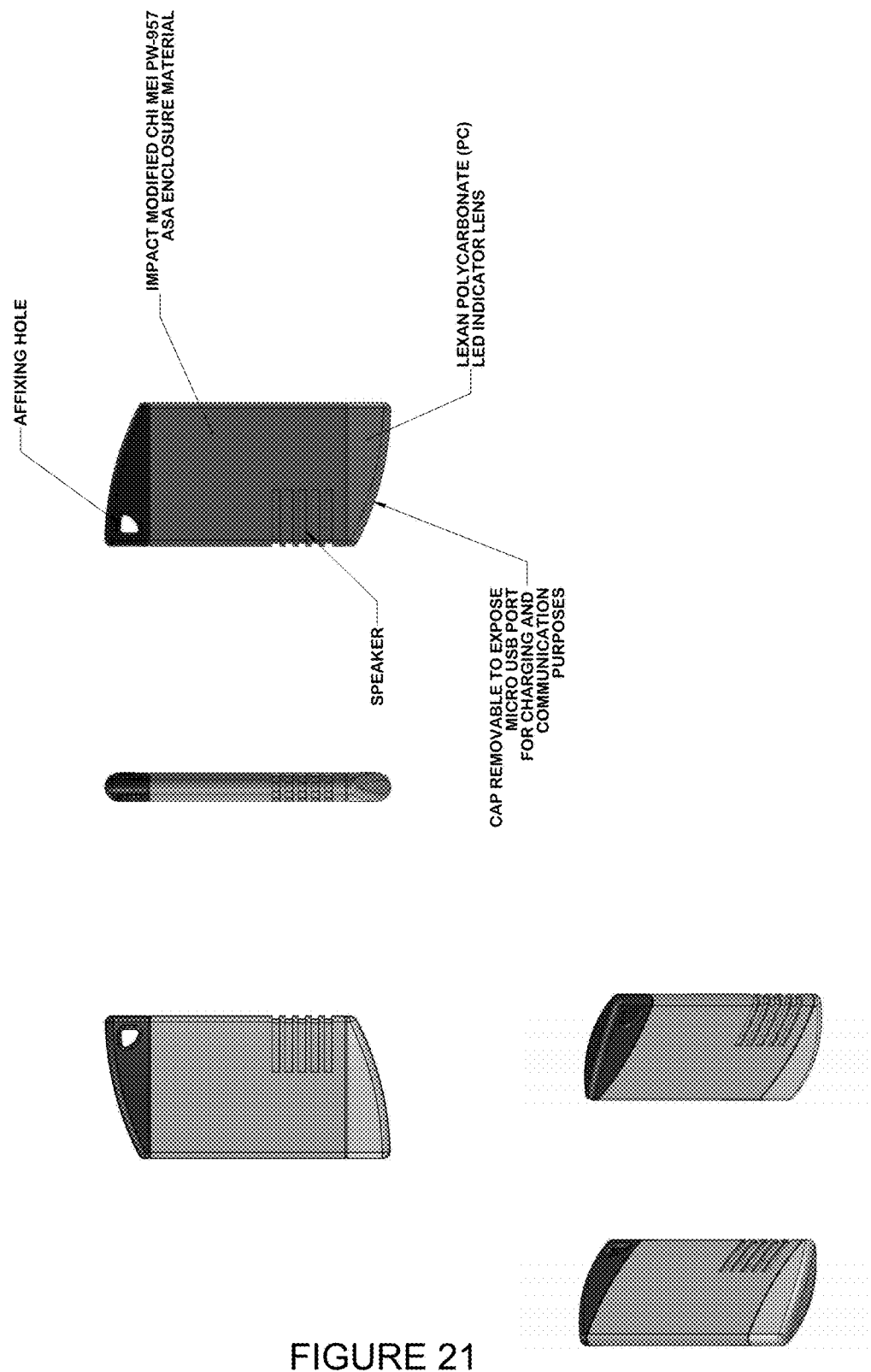
FIG. 21 illustrates several views of a small asset tag receiver, according to one or more embodiments shown and described herein.
Figure 22:
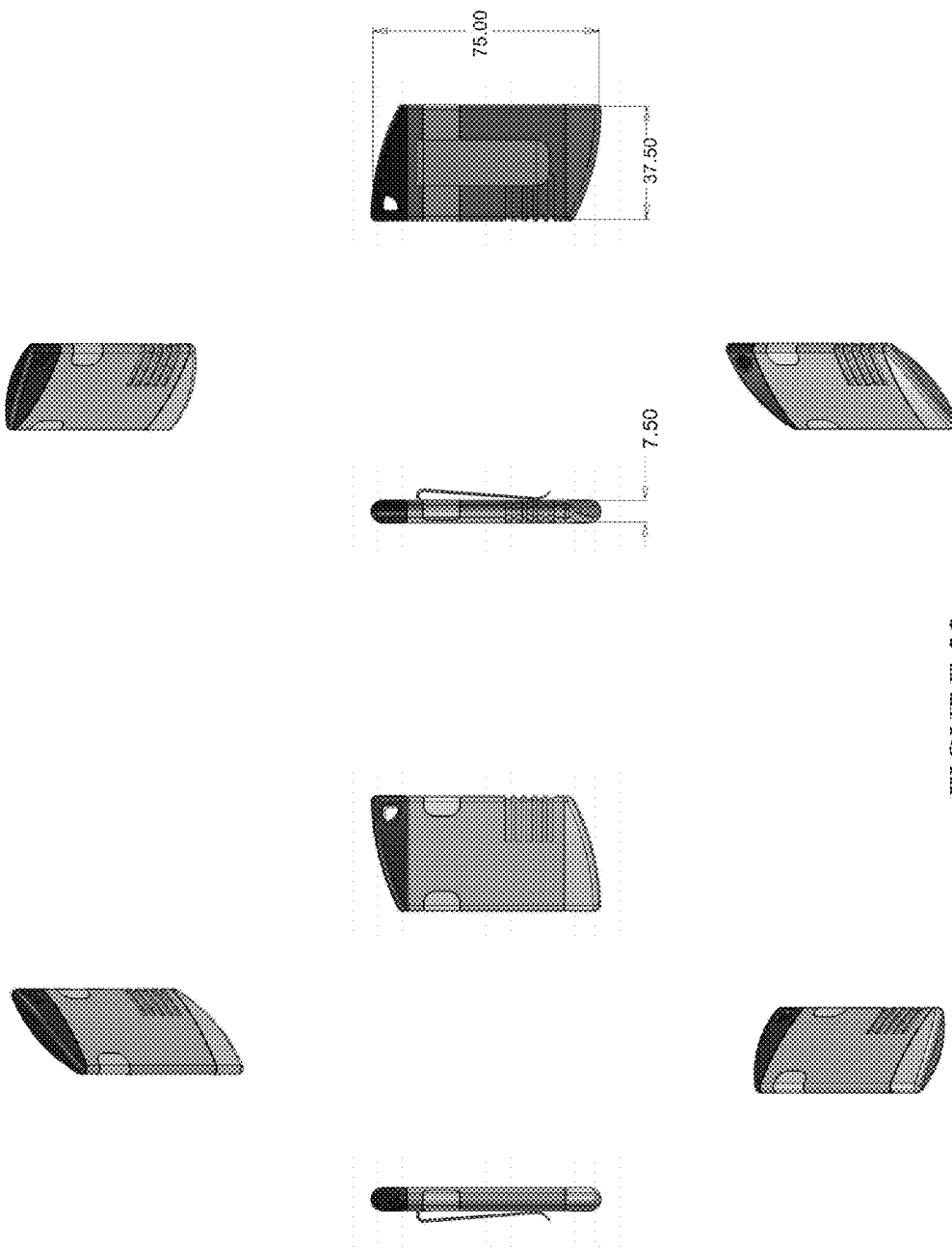
FIG. 22 illustrates several views of a small asset tag receiver with a clip, according to one or more embodiments shown and described herein.
Figure 23:
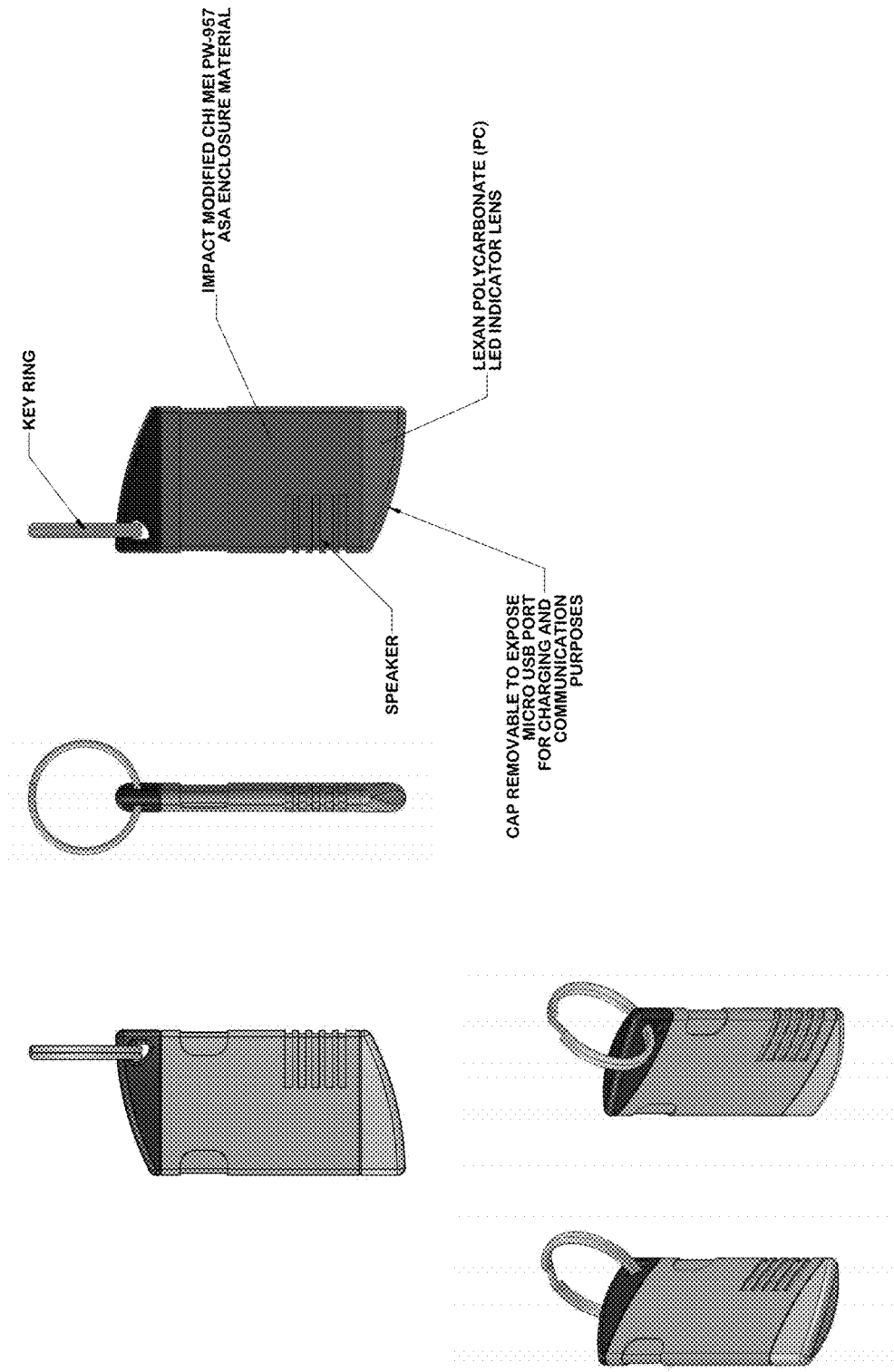
FIG. 23 illustrates several views of a small asset tag receiver with a key ring, according to one or more embodiments shown and described herein.
Figure 24:
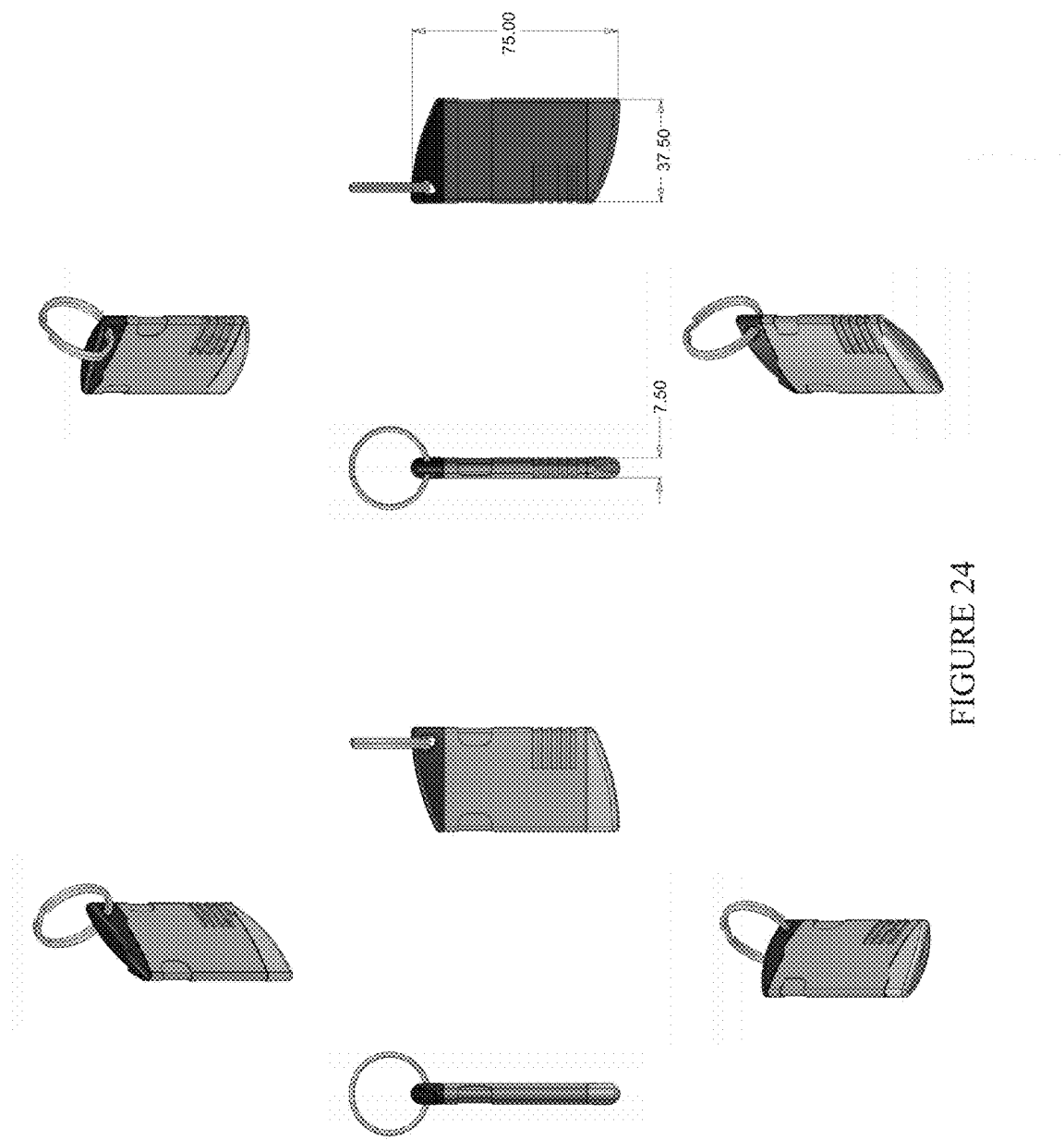
FIG. 24 illustrates several additional views of the small asset tag receiver with a key ring of FIG. 23, according to one or more embodiments shown and described herein.

FIG. 21 shows the tracking locator alarm (TLA) for a small asset. As shown, there is an affixing hole which can be used for assets like key chains and eye glass straps. The case contains a speaker, LED indicator lens, and a removable cap to expose a micro USB port for charging and communication purposes. FIG. 22. shows the how small, thin, and lightweight the TLA may be with suggested measurements of a thickness of 7.5 mm, width of 37.50 mm, and 75 mm. In addition, FIG. 22 shows how a belt clip can be attached to the back. FIG. 23 and FIG. 24 show an example of a key ring secured around the affixing hole in the small asset TLA.

Figure 25:
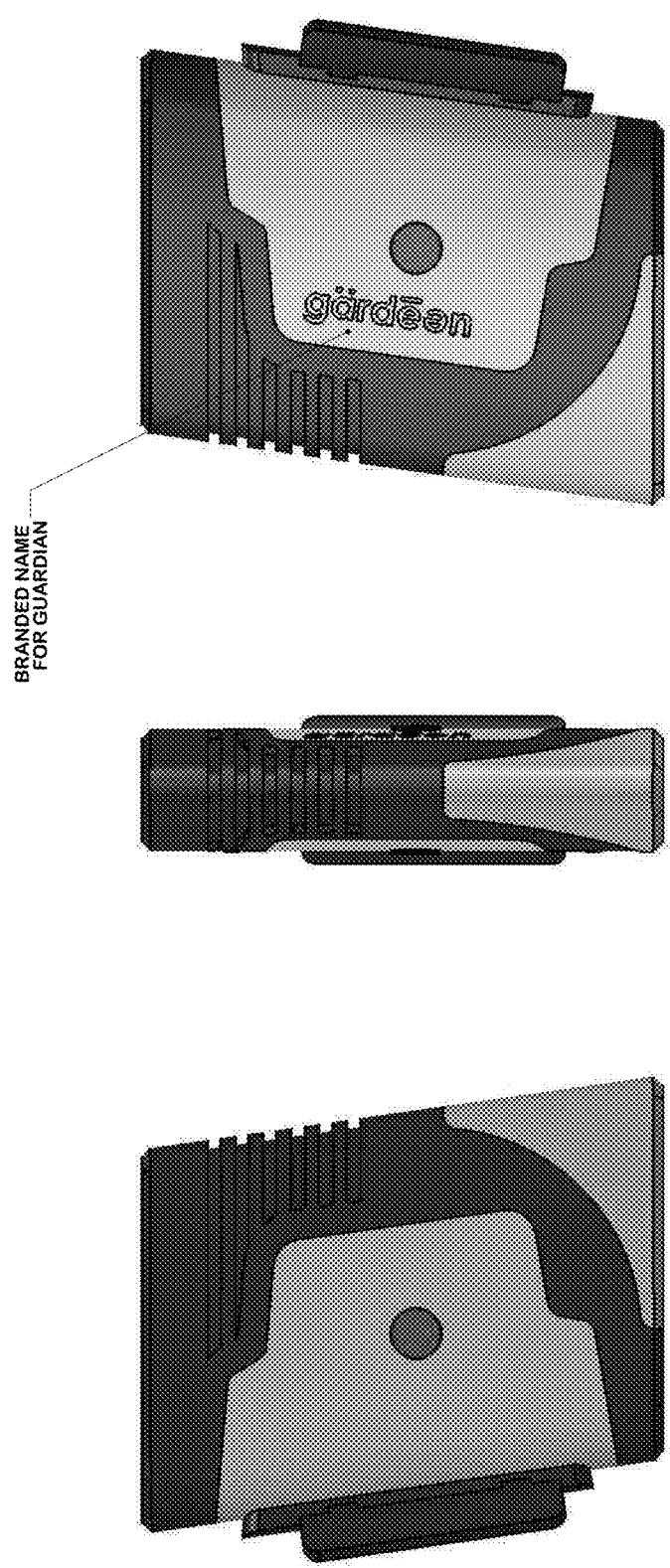
FIG. 25 illustrates several views of a tag receiver configured to be mounted to a bicycle, according to one or more embodiments shown and described herein.
Figure 26:
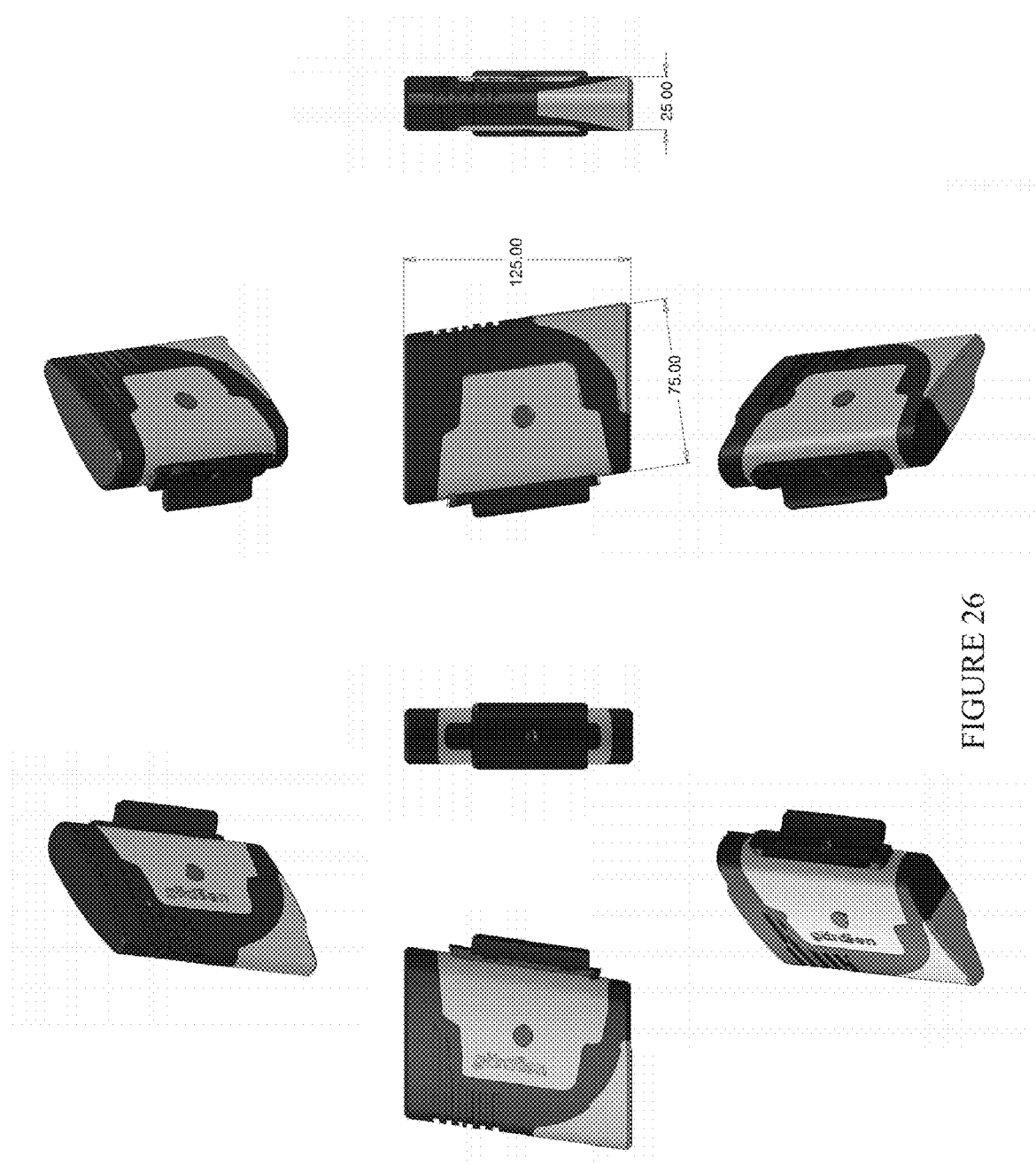
FIG. 26 illustrates several additional views of the tag receiver configured to be mounted to a bicycle of FIG. 25, according to one or more embodiments shown and described herein.
Figure 27:
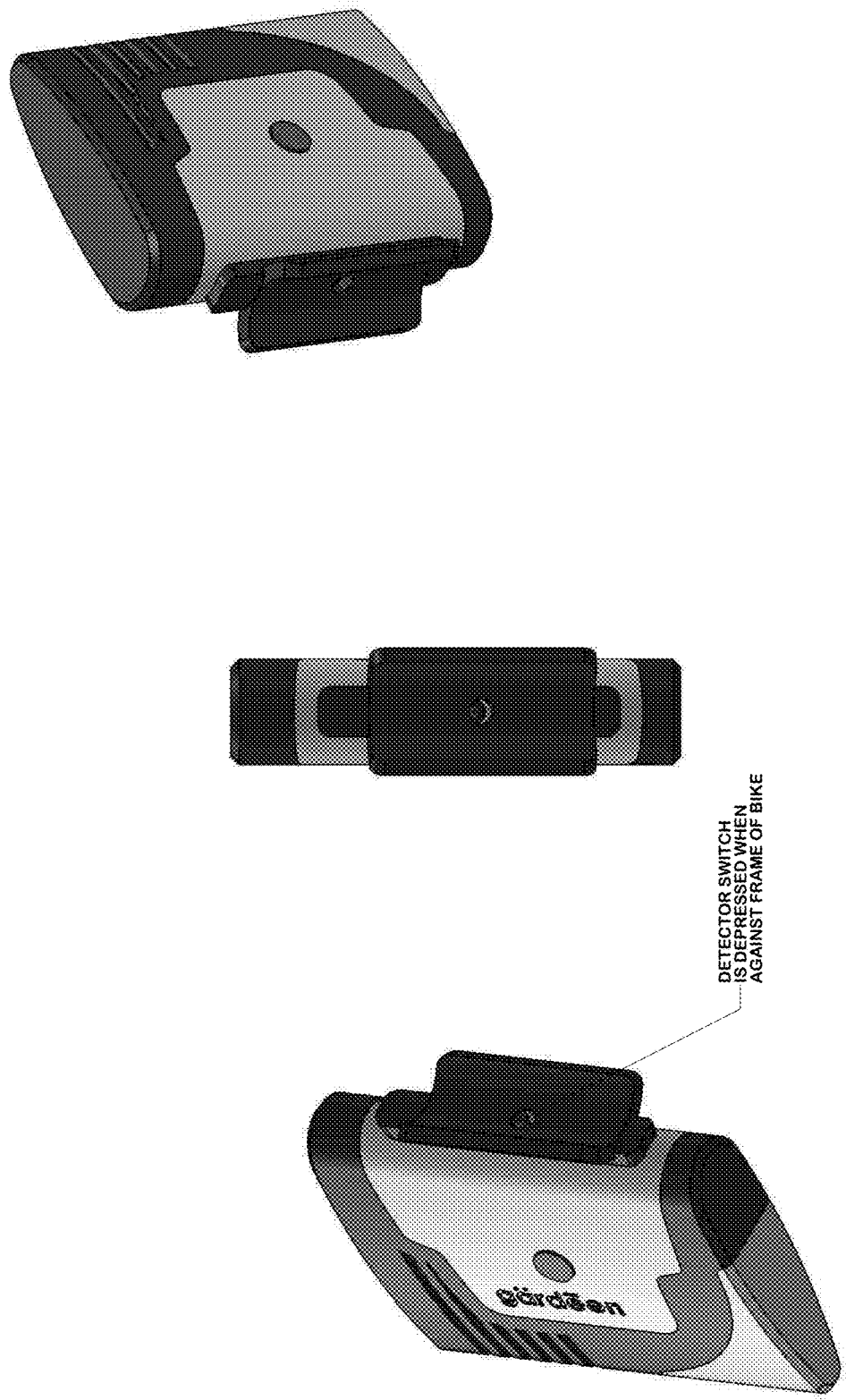
FIG. 27 illustrates a detailed view of a detector switch of the tag receiver configured to be mounted to a bicycle of FIG. 25, according to one or more embodiments shown and described herein.

FIG. 25 shows a rendering of a TLA casing for a bicycle that would be secured to the bicycle frame using a mounting bracket on the mounting sleeve case that securely clamps and locks to the frame. FIG. 26 shows sample measurements of the bicycle TLA with a thickness of 25 mm, a width of 75 mm, and a height of 125 mm. FIG. 27 shows a motion detector/dead man switch that is depressed when against the frame of the bicycle.

Figure 28:
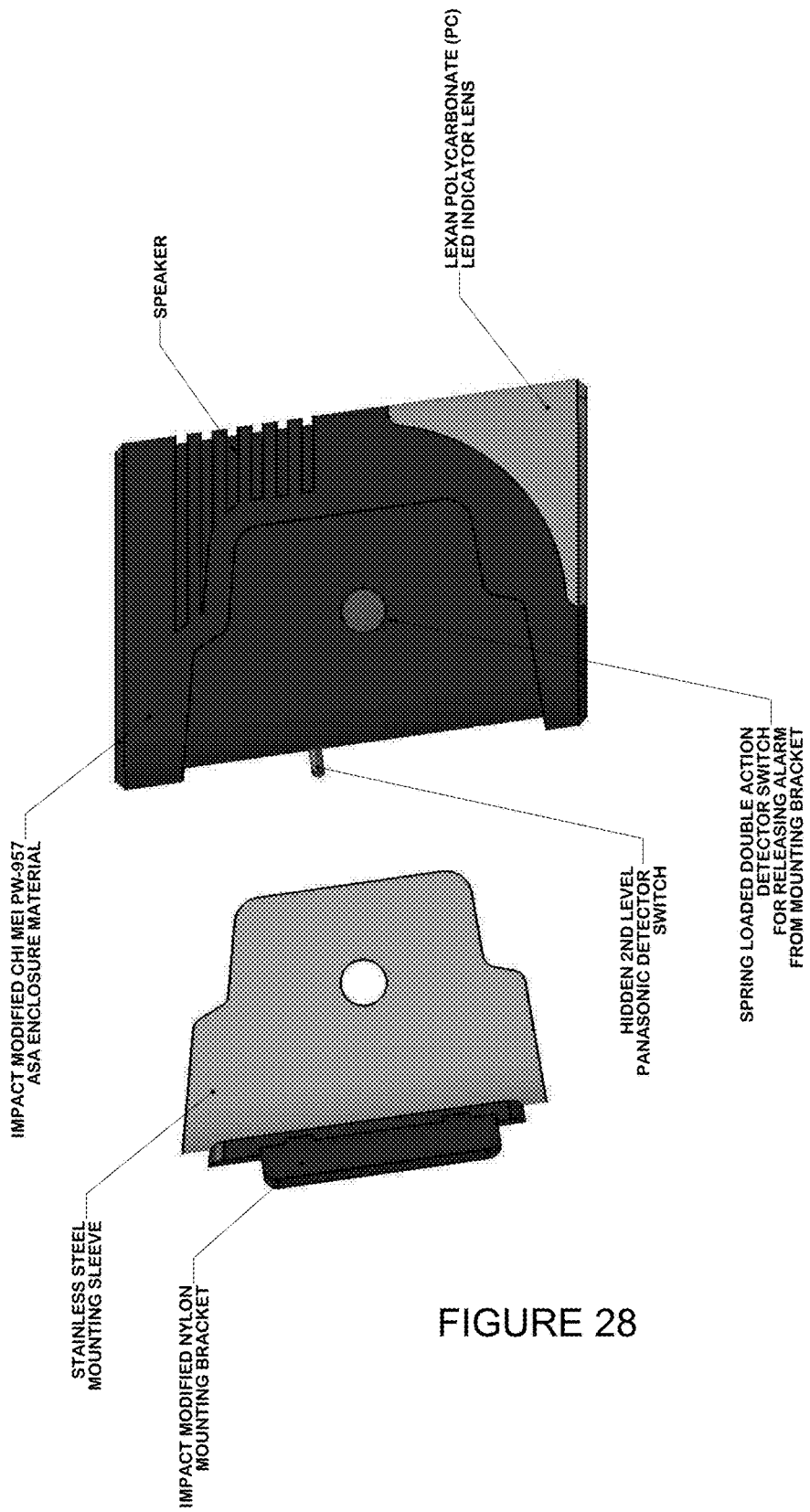
FIG. 28 illustrates the tag receiver configured to be mounted to a bicycle of FIG. 25 detached from a mounting bracket, according to one or more embodiments shown and described herein.
Figure 29:
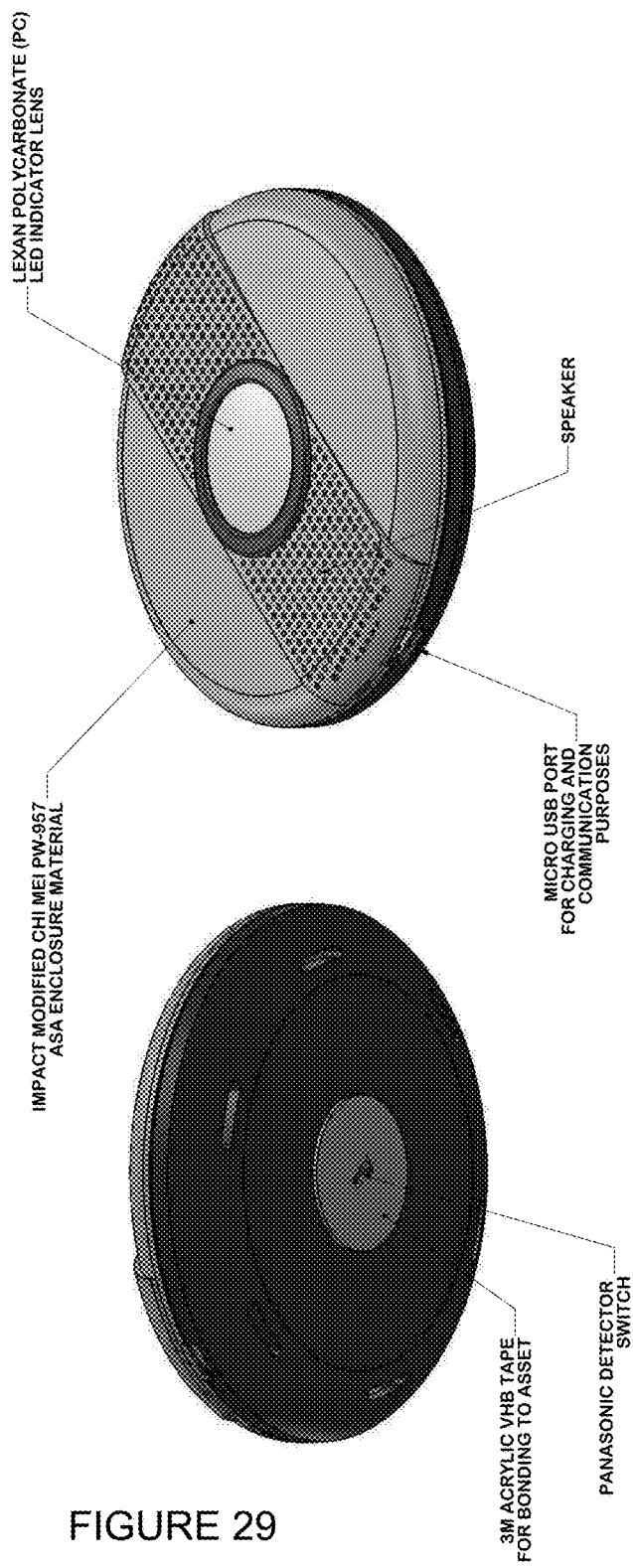
FIG. 29 illustrates front and rear views of an asset tag receiver, according to one or more embodiments shown and described herein.
Figure 30:
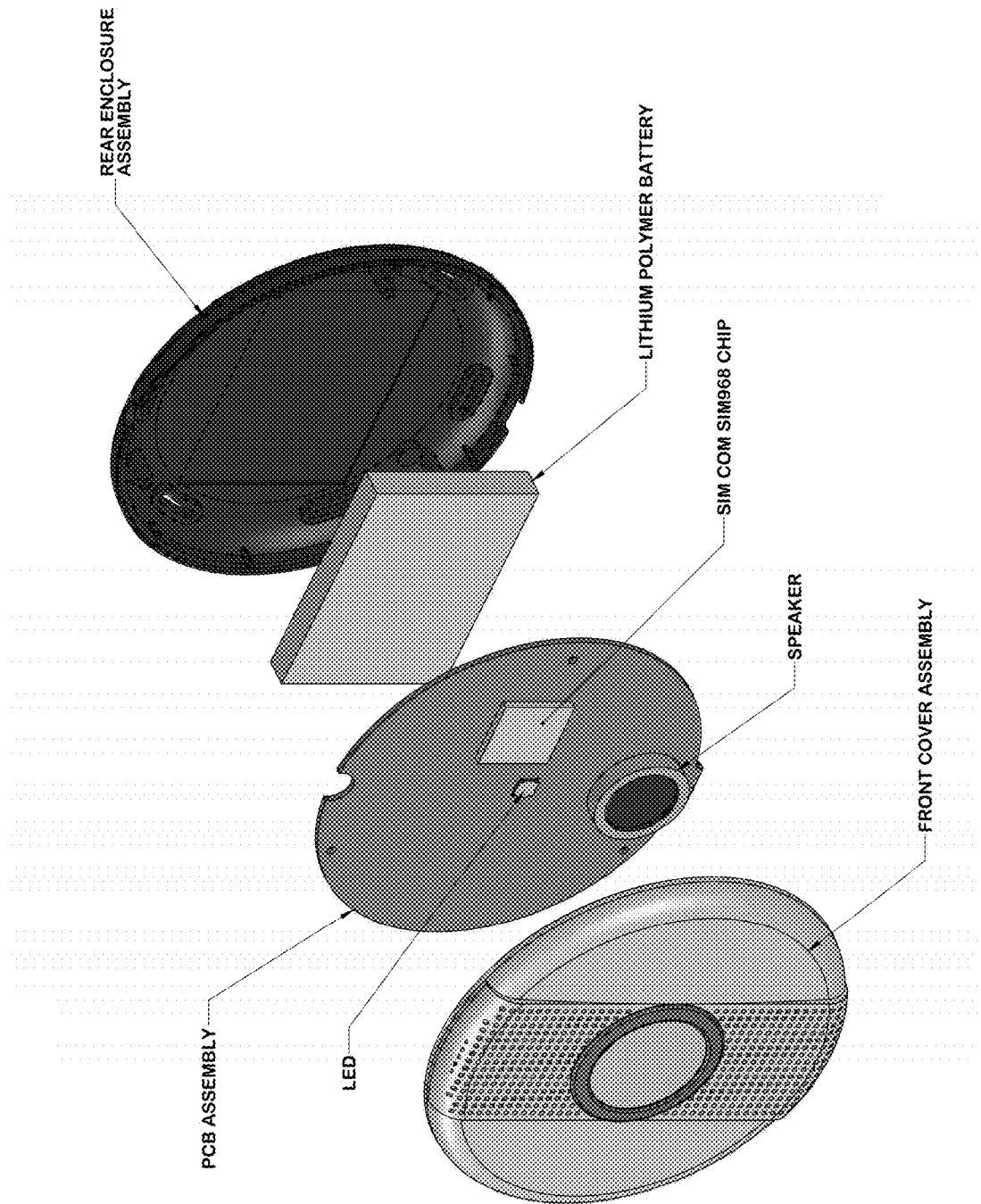
FIG. 30 illustrates an exploded view of the asset tag receiver of FIG. 29, according to one or more embodiments shown and described herein.
Figure 31:
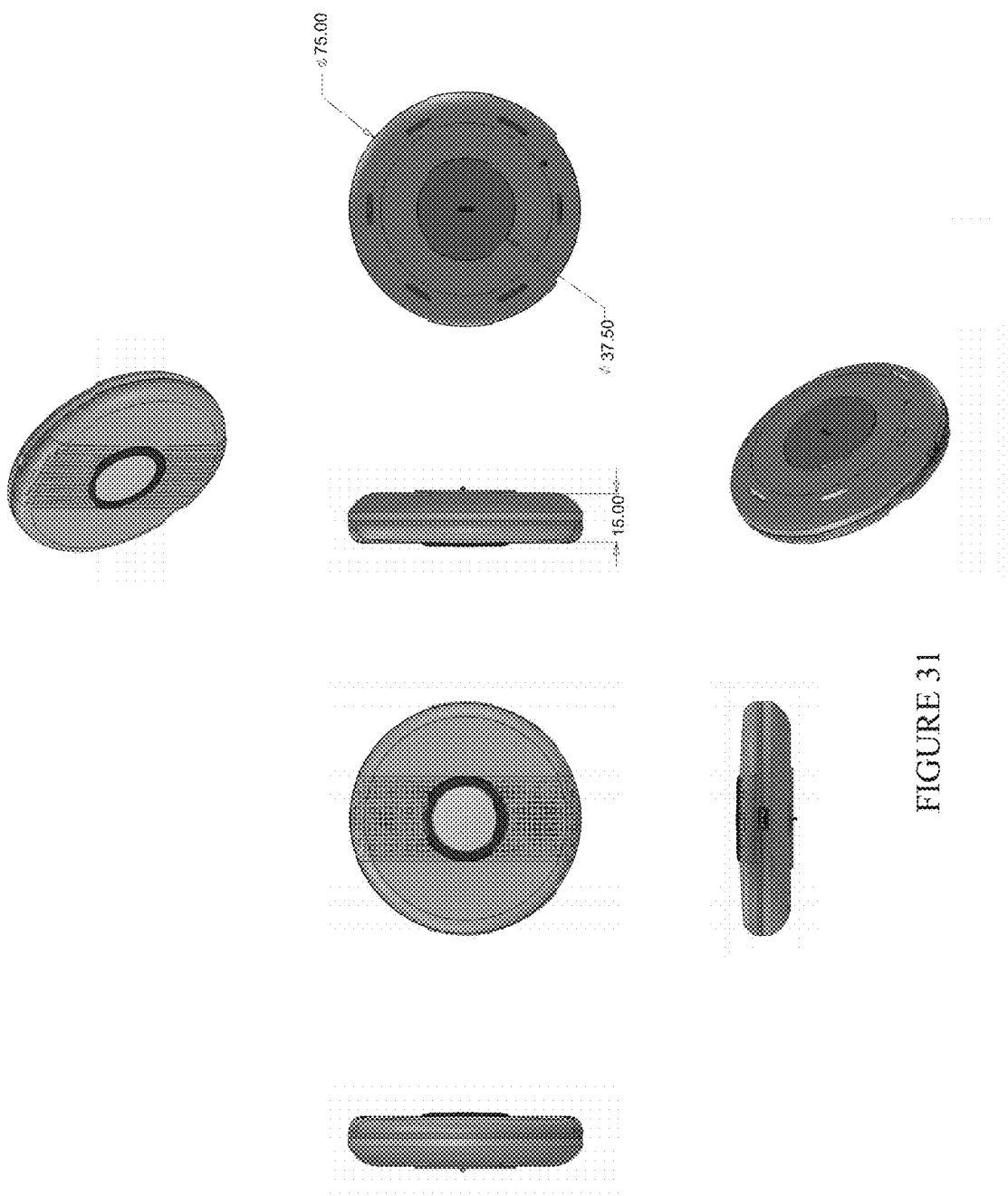
FIG. 31 illustrates several additional views of the asset tag receiver of FIG. 29, according to one or more embodiments shown and described herein.
Figure 32:
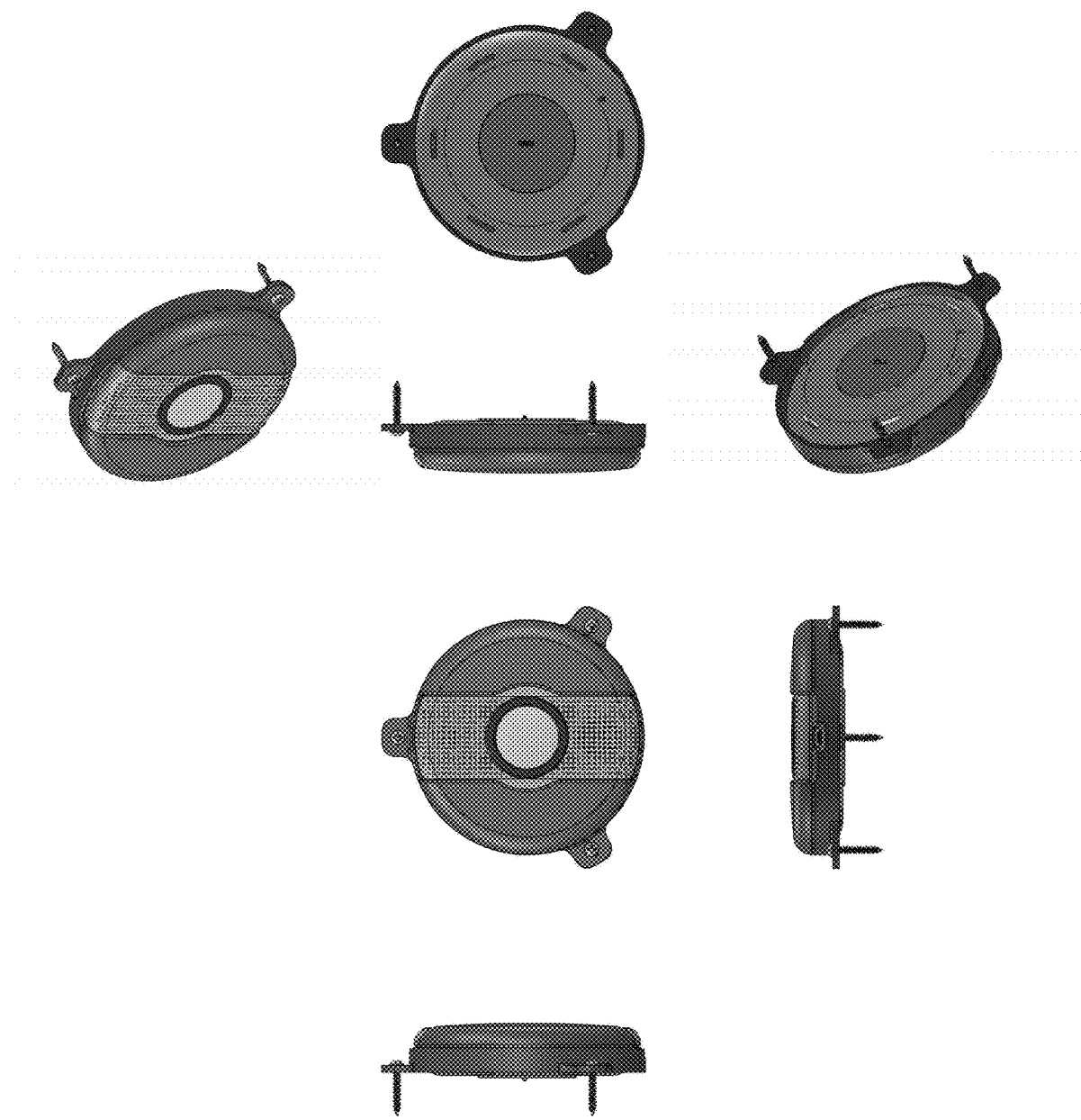
FIG. 32 illustrates the asset tag receiver of FIG. 29 with a security frame attached thereto, according to one or more embodiments shown and described herein.

FIG. 28 shows the security features of the bicycle TLA. The mounting sleeve is stainless steel. The mounting bracket is impact modified nylon. The TLA has a hidden second level panasonic detector switch, a spring loaded double action detector switch for releasing alarm from mounting bracket, an audio speaker, and an LED indicator lens. FIG. 29 shows the security and functional features for a fixed asset TLA—an asset that typically remains stationary. The fixed asset TLA has a speaker, LED indicator lens, and micro USB port for charging and communication purposes. The bottom has 3M acrylic VHB tape for bonding to asset and a panasonic detector switch. FIG. 30 shows an exploded view of the fixed asset TLA. As shown, there is a front cover assembly and rear enclosure assembly. Inside the front and rear enclosures contain the PCB assembly, LED, speaker, and SIM COM SIM968 chip and lithium polymer battery. It should be noted that these are demonstrative of key features and not exhaustive of all the components inside. Moreover, the figures show a circular design while other shaped designs are also contemplated by the embodiments described herein such as in FIG. 33. FIG. 31 shows suggested measurements of the fixed asset with 3M VHB adhesive tap. FIG. 32 shows a fixed asset TLA with a security frame enabling the TLA to be screwed into a rigid wall, structure, or mounting surface. As shown, the security frame contains three (3) mounting screw holes for securing the fixed asset TLA with three (3) screws.

Figure 33:
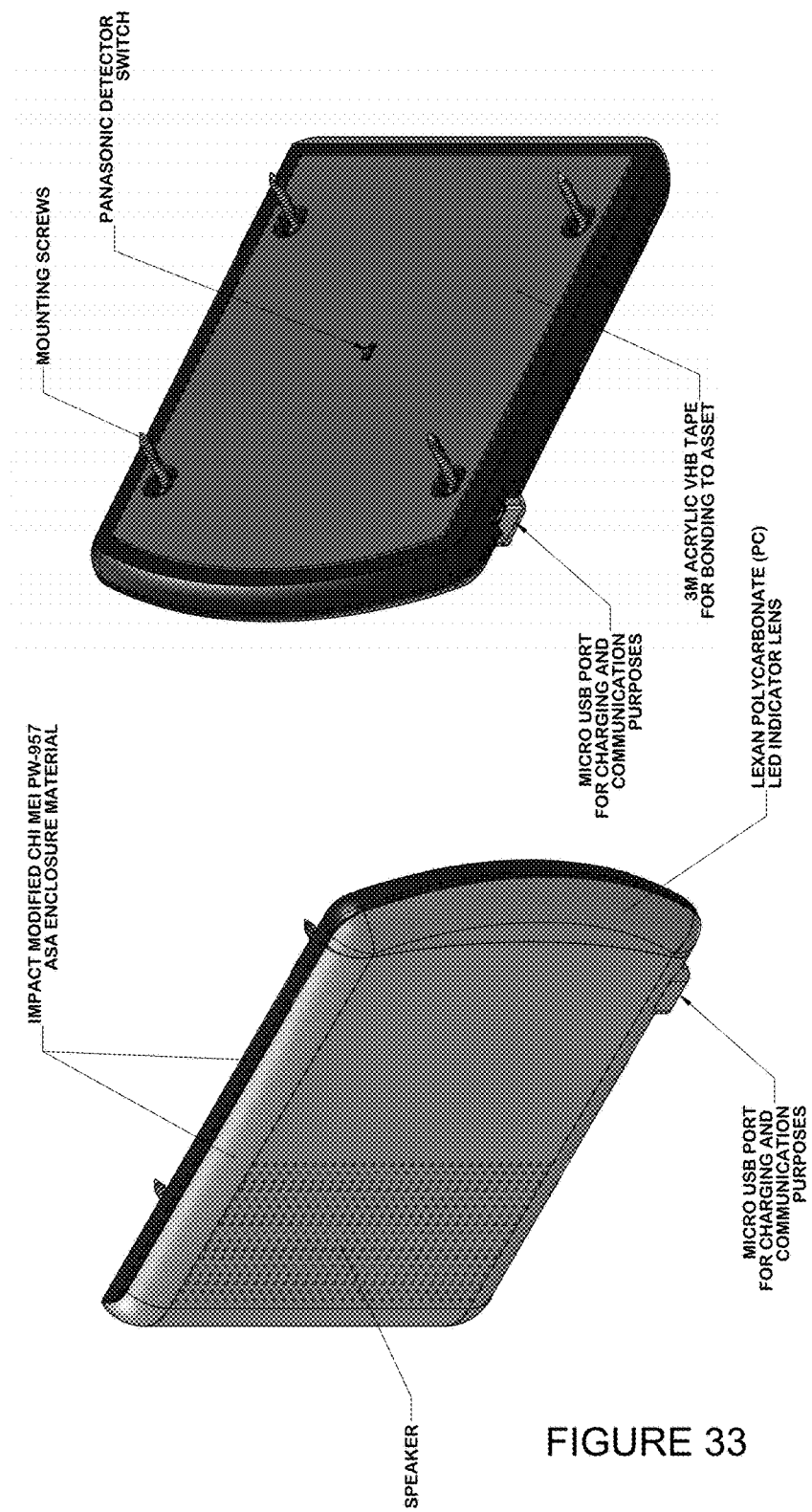
FIG. 33 illustrates a front and rear view of another asset tag receiver, according to one or more embodiments shown and described herein.
Figure 34:
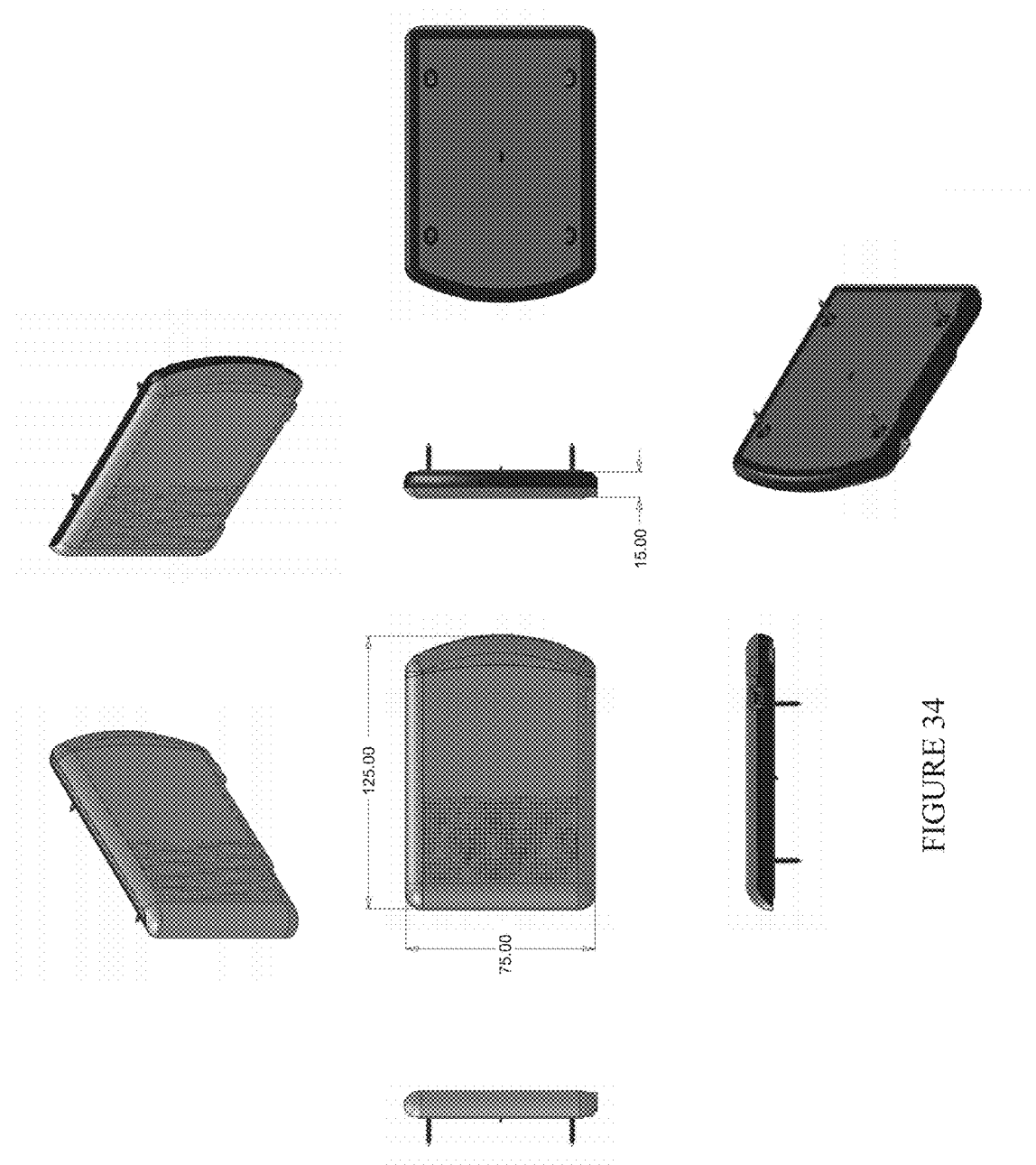
FIG. 34 illustrates several additional views of the asset tag receiver of FIG. 33, according to one or more embodiments shown and described herein.
Figure 35:
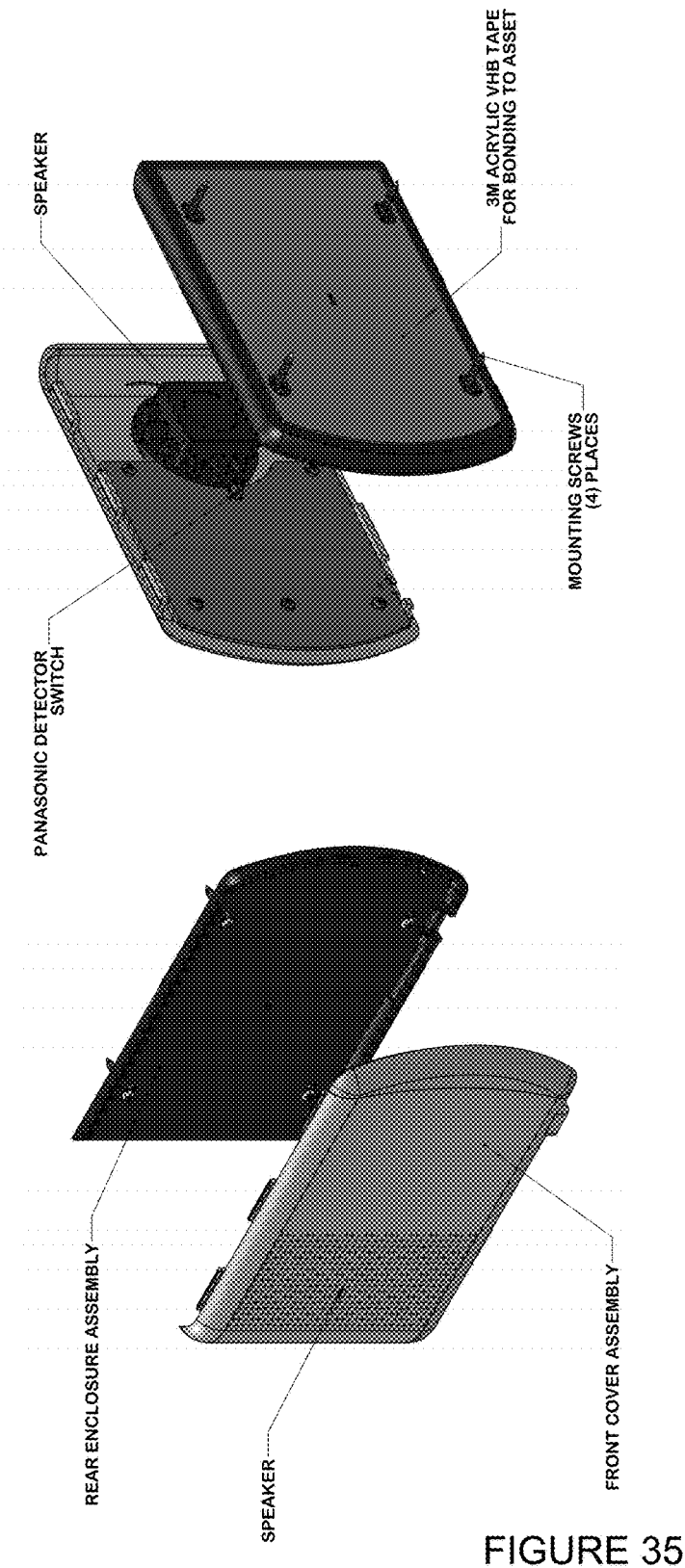
FIG. 35 illustrates an exploded view of the asset tag receiver of FIG. 33, according to one or more embodiments shown and described herein.

FIG. 33 shows a second fixed asset TLA design. This design is rectangular shaped with one rounded end. As shown, the second design has a an audio speaker, micro USB port for charging and communication purposes, an LED indicator lens. The bottom contains mounting screws, a panasonic detector switch, and 3M acrylic VHB tape for bonding to asset. FIG. 34 shows suggested measurements of the second fixed asset TLA design: a thickness of 15 mm, a height of 75 mm, and width of 125 mm. FIG. 35 shows an exploded view of the second fixed asset TLA design. As shown, there is a front cover assembly and a rear enclosure assembly with four (4) mounting screw places and 3M acrylic VHB tape for bonding to asset. Inside components include the panasonic detector switch. A suggested material for the front and rear assembly covers of each of the TLAs shown in FIGS. 21, 28, 29, and 33, is impact modified CHI MEI PW-957 ASA enclosure material.

Figure 36:
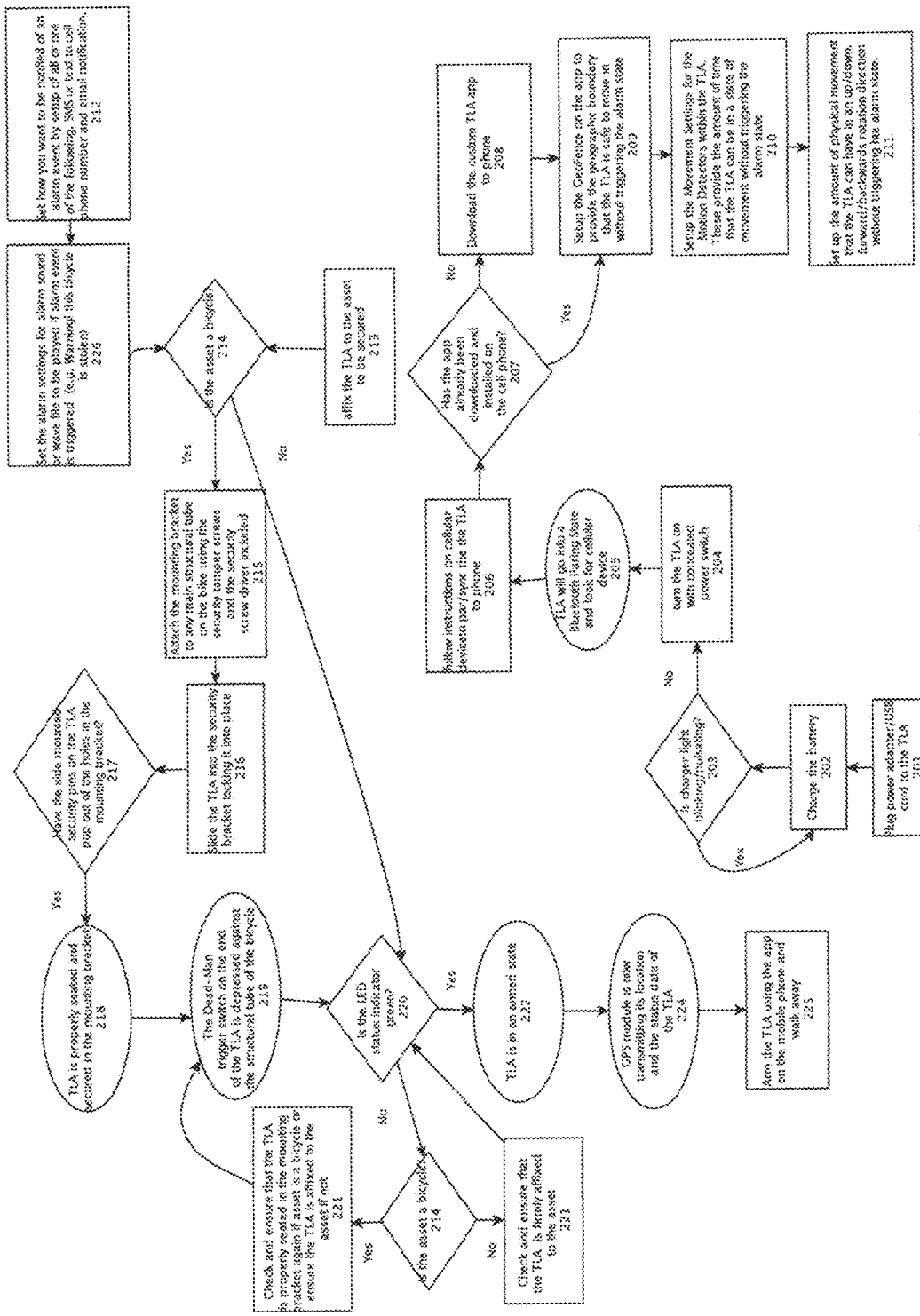
FIG. 36 illustrates another flow diagram depicting an additional method of arming and activating an alert of a multi-modal tracking locator alert system according to one or more embodiments shown and described herein.
Figure 37:
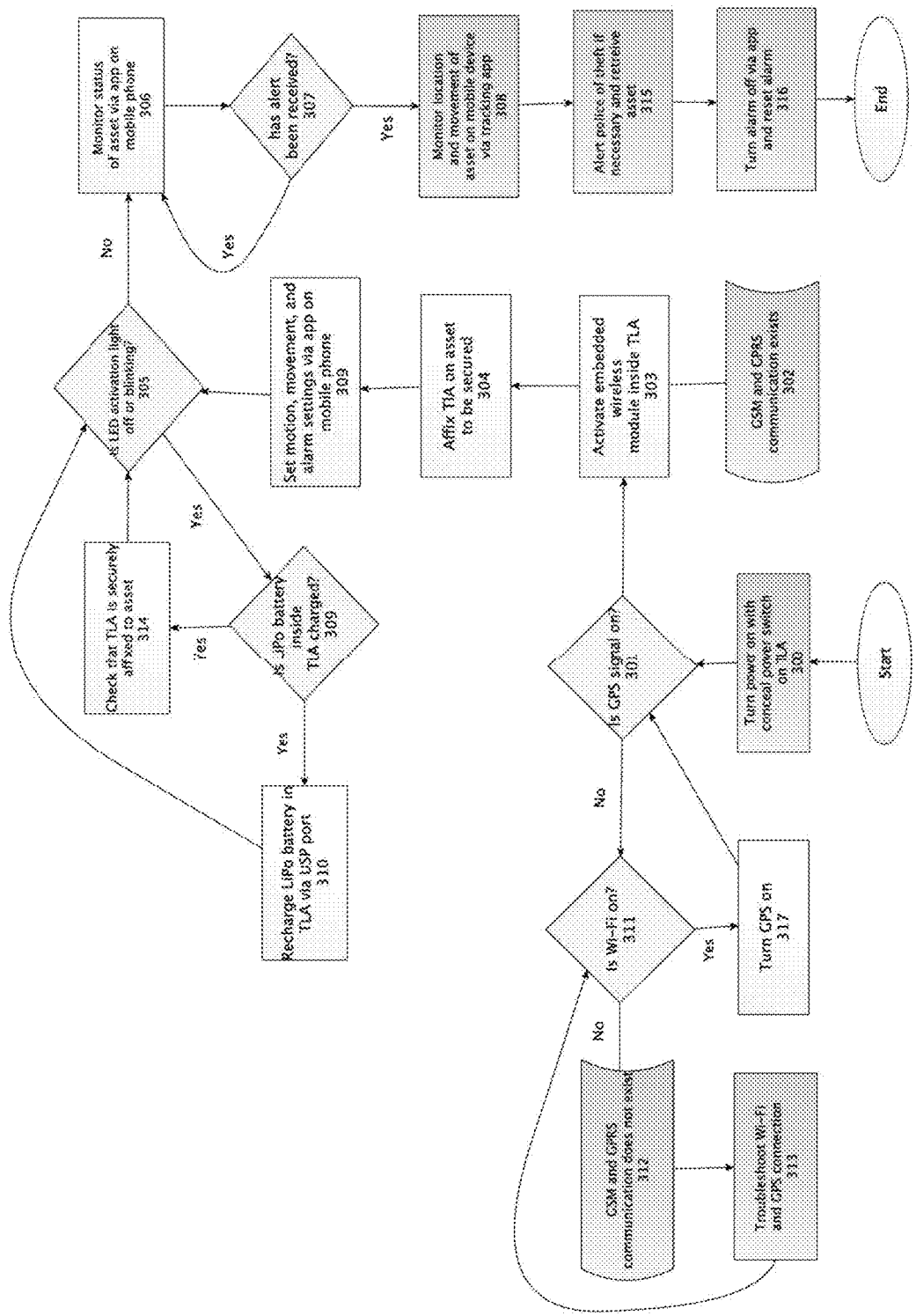
FIG. 37 illustrates another flow diagram depicting an additional method of arming and activating an alert of a multi-modal tracking locator alert system according to one or more embodiments shown and described herein.

FIGS. 36-37 illustrate additional flow diagram depicting additional methods of arming and activating an alert of a multi-modal tracking locator alert system.

Figure 38:
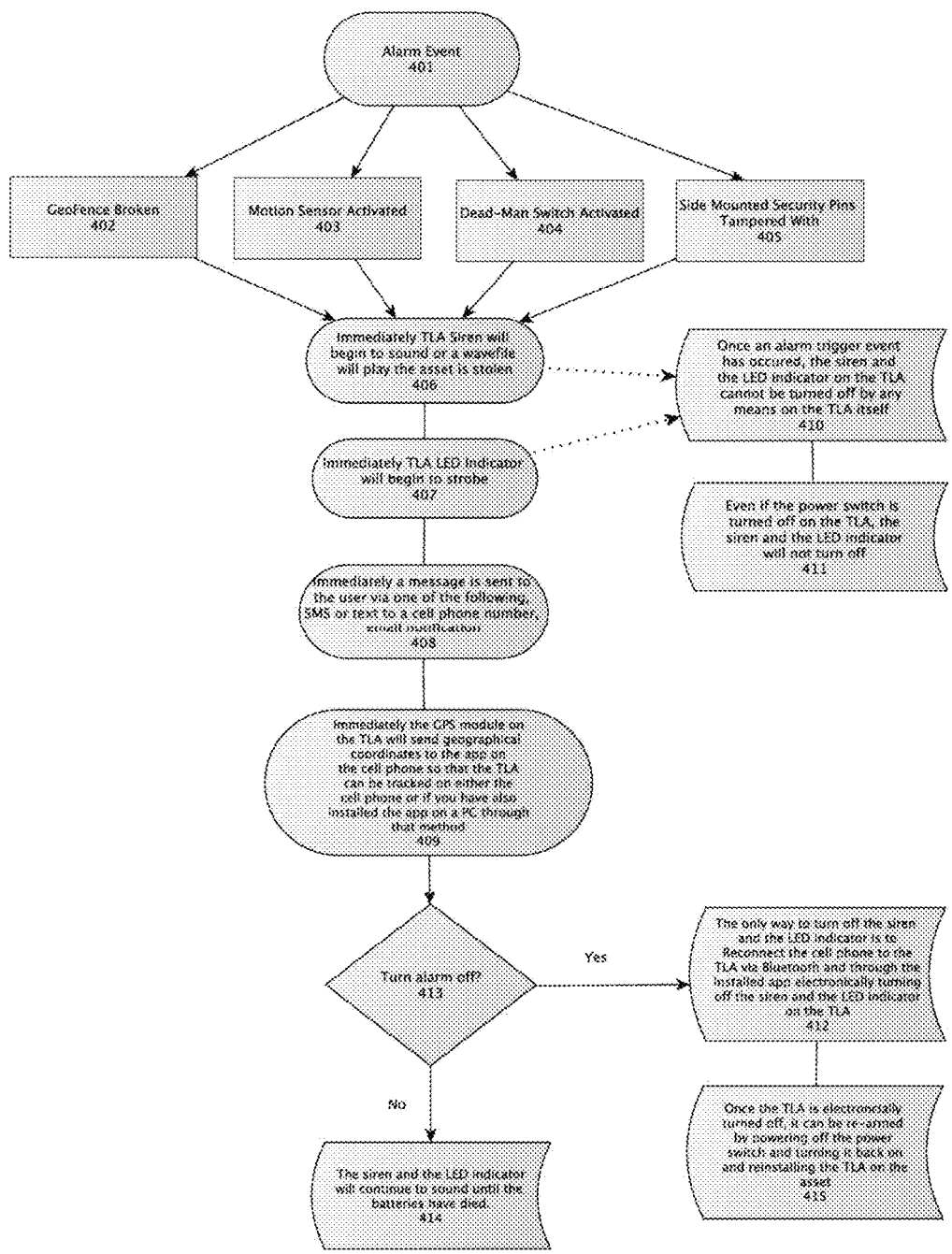
FIG. 38 illustrates a flow diagram depicting the response of a multi-modal tracking locator alert system according to one or more embodiments shown and described herein.

FIG. 38 illustrates a flow diagram depicting the response of a multi-modal tracking locator alert system.

It should be understood that embodiments described herein provide for multi-modal tracking locator alarm systems for securing, locking, tracking, locating, and alerting a user to the whereabouts of an asset. The multi-modal tracking locator alarm systems described herein may indicate the status of a secured asset and allow the user to find the asset or alert the user to a theft situation, thereby allowing the user to retrieve their assets when lost or stolen.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tagged receiver comprising:
one or more processors;
one or more memory modules communicatively coupled to the one or more processors;
an alarm light indicator communicatively coupled to the one or more processors;
a speaker communicatively coupled to the one or more processors;
network interface hardware communicatively coupled to the one or more processors;
one or more motion sensors communicatively coupled to the one or more processors;
a power supply, providing power to the tagged receiver, comprising one or more embedded chips, wherein the one or more embedded chips comprise one or more WiFi Chips, one or more GPS chips, one or more Bluetooth Chips, one or more RFID Chips, or a combination thereof;
a satellite antenna for sending and receiving GPS location data; and
machine readable instructions stored in the one or more memory modules that cause the tagged receiver to perform at least the following when executed by the one or more processors:
receive a command over the network interface hardware, wherein the command includes arming the tagged receiver, disarming the tagged receiver, emitting an alert from the tagged receiver, sending data indicative of location, or a combination thereof;
execute the received command;
send data indicative of the status of an asset to which the tagged receiver is attached over the network interface hardware;
determine an alert event has occurred, wherein the alert event includes the motion sensors sensing a movement of the asset, receiving a command to emit an alert over the network interface hardware, the asset leaving a predetermined geo-fenced area, or a combination thereof; and
activate an alert in response to determining that the alert event has occurred, wherein the alert includes a user programmable audio alarm output with the speaker, wherein the user programmable audio alarm optionally comprises a high decibel alarm that is output at a higher decibel than an output of the speaker when the alert event has not occurred.

2. The tagged receiver of claim 1 further comprising:
a body;
a removable body panel, wherein the one or more motion sensors are configured to sense an unauthorized motion of the removable body panel; and
an activation switch located behind the removable body panel, wherein the activation switch is configured to place the tagged receiver in an on state or an off state.

3. The tagged receiver of claim 1 further comprising a display communicatively coupled to the one or more processors, wherein the one or more processors execute machine readable instructions to visually output on the display data regarding the armed status of the asset.

4. The tagged receiver of claim 3 further comprising an accelerometer configured to measure the speed and acceleration of the tagged receiver.

5. The tagged receiver of claim 1 further comprising a camera communicatively coupled to the one or more processors, wherein the one or more processors automatically execute machine readable instructions in response to an alarm event to actuate the camera to automatically capture images in the vicinity of the tagged receiver.

6. The tagged receiver of claim 1, wherein the user programmable audio alarm is personalized to the type of asset to which the tagged receiver is attached.

7. The tagged receiver of claim 1 further comprising tactile input hardware communicatively coupled to the one or more processors, wherein the tactile input hardware includes an alarm activation button, that when depressed, cause the one or more processors to execute machine readable instructions to the alert.

8. The tagged receiver of claim 1 further comprising tactile input hardware communicatively coupled to the one or more processors, wherein the tactile input hardware includes a passcode entry system that includes a keypad, a security card receiving slot, a retina scanner, a finger print scanner, or a combination thereof.

9. The tagged receiver of claim 1 further comprising a microphone communicatively coupled to the one or more processors, wherein the microphone receives acoustic vibrations, and the one or more processors execute machine readable instructions to transform the acoustic vibrations received by the microphone into a speech input signal.

10. The tagged receiver of claim 1 further comprising and RFID scanner, wherein the one or more memory modules comprise one or more RFID decoder algorithms, wherein the one or more processors execute the RFID decoder algorithms to process RFID signals read by the RFID scanner.

11. A tracking locator alert system comprising:
a control device comprising:
 a first one or more processors;
 a first one or more memory modules communicatively coupled to the one or more processors;
 a first display communicatively coupled to the first one or more processors;
 a first power supply, providing power to the control device;
 a digital compass including a magnetic sensor, wherein the digital compass is communicatively coupled to the one or more processors;
 a first microphone communicatively coupled to the first one or more processors;
 first tactile input hardware communicatively coupled to the first one or more processors;
 first network interface hardware communicatively coupled to the first one or more processors;
 a first satellite antenna for sending and receiving GPS location data; and
 first machine readable instructions stored in the first one or more memory modules that cause the control device to perform at least the following when executed by the first one or more processors:
  receive, through the first network interface hardware, a data signal indicative of the location and the status of an asset;
  display the location and the status of the asset on the first display; and
  send at least one command via the first network interface hardware indicative of at least one of arming the tracking locator alert system, disarming the tracking locator alert system, and activating an alert of the tracking locator alert system; and
one or more tagged receivers configured to communicate wirelessly with the control device, each of the one or more tagged receivers comprising:
 a second one or more processors;
 a second one or more memory modules communicatively coupled to the second one or more processors;
 a magnet that emits a magnetic field that can be detected by magnetic sensors;
 mounting hardware configured to affix the tagged receiver to a tracked asset;
 a second alarm light indicator communicatively coupled to the second one or more processors;
 a second speaker communicatively coupled to the second one or more processors;
 second network interface hardware communicatively coupled to the second one or more processors;
 one or more motion sensors communicatively coupled to the second one or more processors;
 a second power supply, providing power to the tagged receiver, comprising one or more embedded chips, wherein the one or more embedded chips include one or more WiFi chips, one or more GPS chips, one or more Bluetooth chips, one or more RFID chips, or a combination thereof;
 a second satellite antenna for sending and receiving GPS location data;
 second machine readable instructions stored in the second one or more memory modules that cause the tagged receiver to perform at least the following when executed by the second one or more processors:
  receive a command over the second network interface hardware, wherein the command includes arming the tagged receiver, disarming the tagged receiver, emitting an alert from the tagged receiver, sending data indicative of location, or a combination thereof;
  execute the received command;
  send data indicative of the status of an asset to which the tagged receiver is attached over the second network interface hardware to the control device;
  determine an alert event has occurred, wherein the alert event includes the motion sensors sensing a movement of the asset, receiving a command to emit an alert over the second network interface hardware, the asset leaving a predetermined geofenced area, or a combination thereof; and activate an alert in response to determining that the alert event has occurred.

12. The tracking locator alert system of claim 11, wherein the control device further comprises a speaker communicatively coupled to the first one or more processors of the control device, wherein the speaker outputs audible prompts and information regarding the status of an asset, the location of an asset, turn by turn directions to an asset, or a combination thereof.

13. The tracking locator alert system of claim 11, the control device further comprising a first alarm light indicator communicatively coupled to the first one or more processors, wherein the first alarm light indicator provides a visual indicator of when the tracking locator alert system is armed and when the tagged receiver experiences the alert event.

14. The tracking locator alert system of claim 11, wherein the control device and the tagged receiver are remotely synced over one of their respective RFID scanners, Bluetooth chips, WiFi chips, GPS chips, or a combination thereof.

15. The tracking locator alert system of claim 11 further comprising a remote server, wherein location data sent from the tagged receiver through the second network interface hardware is stored and is accessible by one of the control device through the first network interface hardware, an application on a mobile device, and authorized third parties.

16. The tracking locator alert system of claim 11, wherein the tagged receiver further comprises a casing, the casing comprising:
an electronic lock including an associated passcode entry key system, wherein the electronic lock is communicatively coupled to the second one or more processors of the tagged receiver;
a security card reader; and
a security card enabled to be read by the security card reader, wherein the security card is encoded at least to do one of arming the tracking locator alarm system, disarming the tracking locator alarm system, unlocking the electronic lock, or a combination thereof.

17. A method of transmitting an alert comprising:
syncing a tagged receiver configured to attach to and track an asset to a control device such that the tagged receiver and the control device wirelessly communicate with each other;
setting user preferences including geo-fencing parameters, sensitivity of motion sensors, personalized alert output, personalized alert events, or a combination thereof;
monitoring the asset for an alert event;
determining that the alert event has occurred;
activating an alert in response to determining that the alert event has occurred, wherein the alert includes a user programmable audio alarm output with a speaker, wherein the user programmable audio alarm optionally comprises a high decibel alarm that is output at a higher decibel than an output of the speaker when the alert event has not occurred; and
transmitting an alert message comprising GPS coordinates of the tagged receiver to the control device, an internet server, or a combination thereof.

18. The method of claim 17, wherein the tagged receiver comprises a camera, the method further comprising:
capturing images of the vicinity of the tagged receiver with the camera in response to activating the alert; and
transmitting the image to the control device, an internet server, or a combination thereof.

19. The method of claim 17 further comprising:
disarming the tagged receiver by remotely transmitting a command from the control device to the tagged receiver to disarm the tagged receiver; and
programming the user programmable audio alarm on the tagged receiver so that it cannot be deactivated without the user disarming it.

20. The method of claim 17, further comprising:
displaying the location of the asset; and
directing the user to the location of the asset once the user is in the geographic vicinity of the asset.

* * * * *